US012704923B2

(12) United States Patent
Kim

(10) Patent No.: US 12,704,923 B2
(45) Date of Patent: Aug. 11, 2026

(54) ELECTRONIC DEVICE COMPRISING PIEZOELECTRIC DEVICE, AND TOUCH INPUT DETECTION METHOD USING PIEZOELECTRIC DEVICE

(71) Applicant: Samsung Electronics Co., Ltd., Suwon-si (KR)

(72) Inventor: Sangeun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/193,484

(22) Filed: Apr. 29, 2025

(65) Prior Publication Data

US 2025/0258565 A1 Aug. 14, 2025

Related U.S. Application Data

(63) Continuation of application No. PCT/KR2023/014192, filed on Sep. 19, 2023.

(30) Foreign Application Priority Data

Nov. 28, 2022 (KR) ........................ 10-2022-0161803
Dec. 7, 2022 (KR) ........................ 10-2022-0169481

(51) Int. Cl.
*G06F 3/041* (2006.01)
*G06F 3/044* (2006.01)
(Continued)

(52) U.S. Cl.
CPC .......... *G06F 3/04166* (2019.05); *G06F 3/044* (2013.01); *H04R 1/028* (2013.01); *H04R 3/00* (2013.01); *H04R 17/00* (2013.01)

(58) Field of Classification Search
CPC ....... G06F 3/044; G06F 3/04166; G01L 1/16; H04R 3/00
See application file for complete search history.

(56) References Cited

U.S. PATENT DOCUMENTS 9,582,103 B2 2/2017 Ando
10,659,886 B2 5/2020 Lee et al.
(Continued)

FOREIGN PATENT DOCUMENTS

JP 2014011512 A 1/2014
KR 200449126 Y1 6/2010
(Continued)

OTHER PUBLICATIONS

International Search Report for PCT/KR2023/014192 mailed Dec. 21, 2023, 6 pages with English translation.
(Continued)

*Primary Examiner* — Kevin M Nguyen
(74) *Attorney, Agent, or Firm* — Nixon & Vanderhye, P.C.

(57) ABSTRACT

At least one processor, individually and/or collectively, of an electronic device, according to various embodiments of the present disclosure, may be configured to: if communicatively connected to an external electronic device through a short-range communication circuit in a state where a piezoelectric element and an audio output circuit are electrically connected, control at least one switching circuit so that the piezoelectric element and a touch sensing circuit are electrically connected; if a touch input is detected in the piezoelectric element through the touch sensing circuit, control the at least one switching circuit so that the piezoelectric element and the audio output circuit are electrically connected, and output audio through the audio output circuit; and after outputting the audio, control the at least one switching circuit so that the piezoelectric element and the touch sensing circuit are electrically connected.

20 Claims, 11 Drawing Sheets

(51) Int. Cl.

| | |
|---|---|
| ***H04R 1/02*** | (2006.01) |
| ***H04R 3/00*** | (2006.01) |
| ***H04R 17/00*** | (2006.01) |

(56) References Cited

U.S. PATENT DOCUMENTS

| | | | | |
|---|---|---|---|---|
| 11,032,675 | B2 | 6/2021 | Ylönen et al. | |
| 11,341,765 | B2 | 5/2022 | Rhee et al. | |
| 11,646,008 | B2 | 5/2023 | Franzi et al. | |
| 2004/0227721 | A1 | 11/2004 | Moilanen et al. | |
| 2005/0105600 | A1 | 5/2005 | Culum et al. | |
| 2010/0079238 | A1 | 4/2010 | Gravelle et al. | |
| 2020/0125815 | A1 | 4/2020 | Lu et al. | |
| 2022/0004834 | A1 | 1/2022 | Perkins et al. | |
| 2022/0006892 | A1* | 1/2022 | Perkins | G06F 3/02 |

FOREIGN PATENT DOCUMENTS

| | | | |
|---|---|---|---|
| KR | 101450241 | B1 | 10/2014 |
| KR | 101607100 | B1 | 3/2016 |
| KR | 20170111262 | A | 10/2017 |
| KR | 20190143737 | A | 12/2019 |
| KR | 20200053422 | A | 5/2020 |
| KR | 102286822 | B1 | 8/2021 |
| TW | I661290 | | 6/2019 |

OTHER PUBLICATIONS

Written Opinion of the ISA for PCT/KR2023/014192 mailed Dec. 21, 2023, 5 pages.

Extended European Search Report dated Oct. 13, 2025 issued in European Patent Application No. 23898022.1.

* cited by examiner

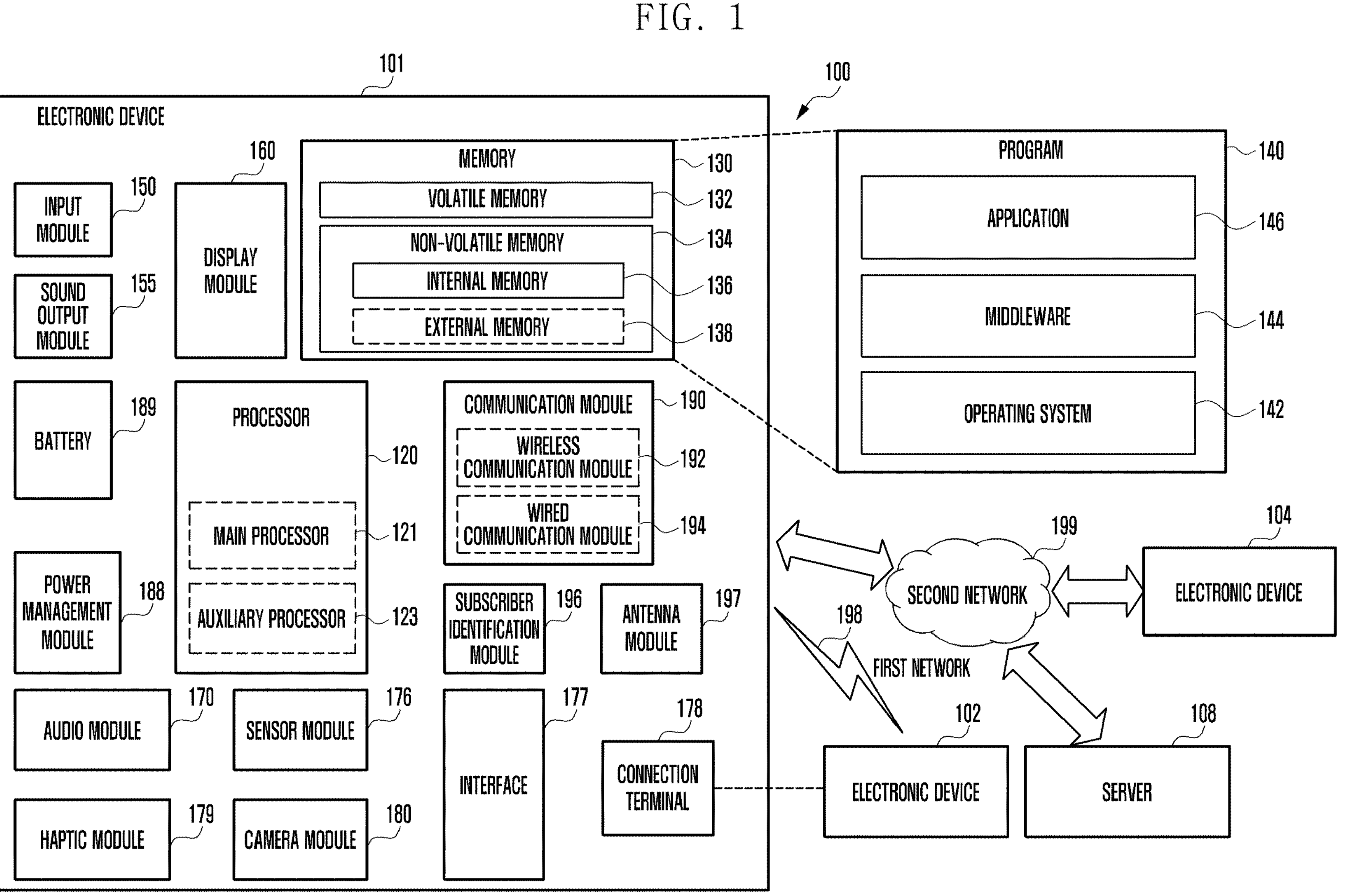
FIG. 1
101
100
ELECTRONIC DEVICE
150
INPUT MODULE
155
SOUND OUTPUT MODULE
160
DISPLAY MODULE
130
MEMORY
132
VOLATILE MEMORY
134
NON-VOLATILE MEMORY
136
INTERNAL MEMORY
138
EXTERNAL MEMORY
140
PROGRAM
146
APPLICATION
144
MIDDLEWARE
142
OPERATING SYSTEM
189
BATTERY
120
PROCESSOR
121
MAIN PROCESSOR
123
AUXILIARY PROCESSOR
190
COMMUNICATION MODULE
192
WIRELESS COMMUNICATION MODULE
194
WIRED COMMUNICATION MODULE
188
POWER MANAGEMENT MODULE
196
SUBSCRIBER IDENTIFICATION MODULE
197
ANTENNA MODULE
199
SECOND NETWORK
104
ELECTRONIC DEVICE
198
FIRST NETWORK
170
AUDIO MODULE
176
SENSOR MODULE
177
INTERFACE
178
CONNECTION TERMINAL
102
ELECTRONIC DEVICE
108
SERVER
179
HAPTIC MODULE
180
CAMERA MODULE FIG. 2A
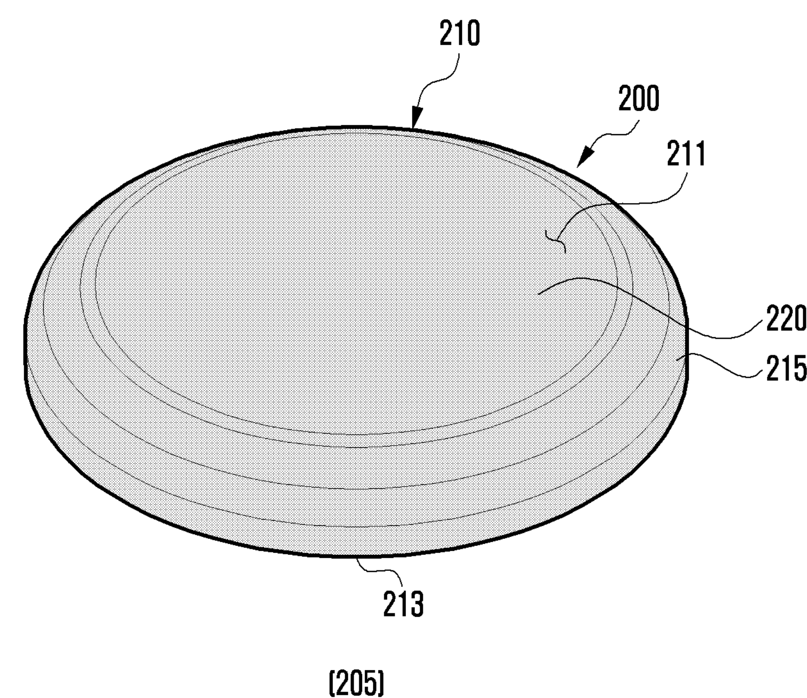
(205)
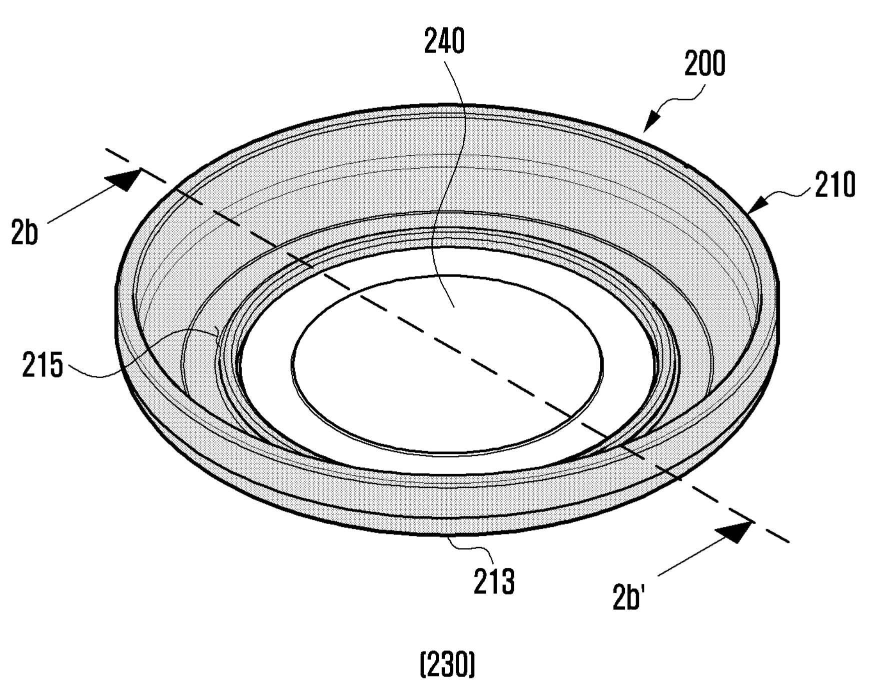
(230)

FIG. 3
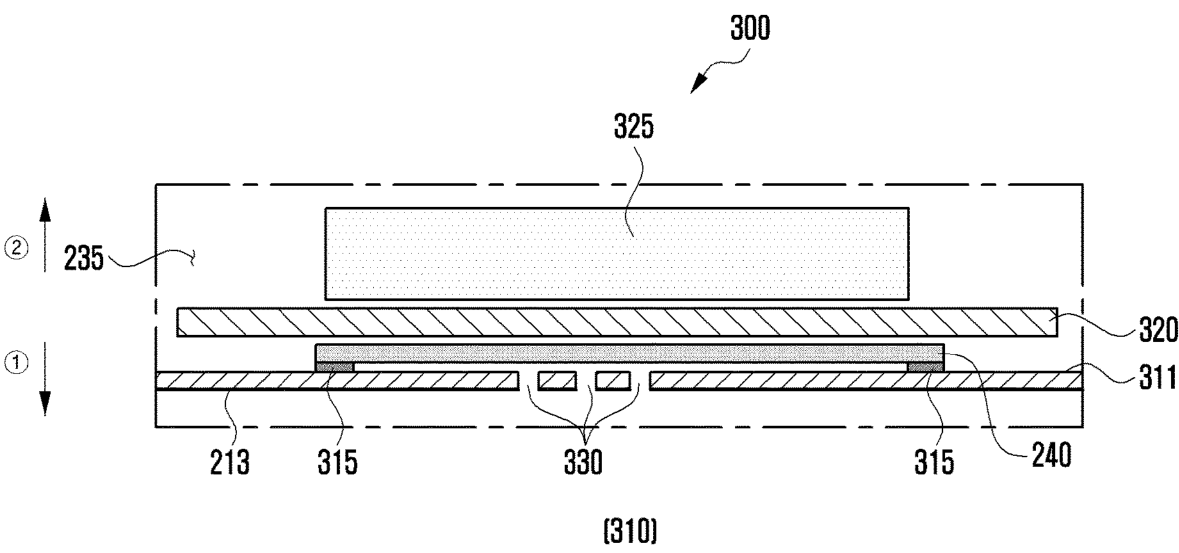
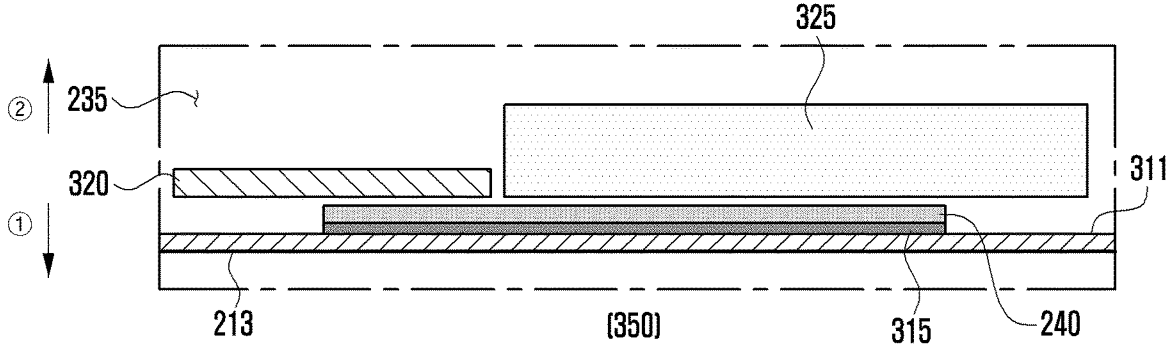

FIG. 5B

ELECTRONIC DEVICE COMPRISING PIEZOELECTRIC DEVICE, AND TOUCH INPUT DETECTION METHOD USING PIEZOELECTRIC DEVICE

CROSS-REFERENCE TO RELATED APPLICATIONS

This application is a continuation of International Application No. PCT/KR2023/014192 designating the United States, filed on Sep. 19, 2023, in the Korean Intellectual Property Receiving Office and claiming priority to Korean Patent Application Nos. 10-2022-0161803, filed on Nov. 28, 2022, and 10-2022-0169481, filed on Dec. 7, 2022, in the Korean Intellectual Property Office, the disclosures of each of which are incorporated by reference herein in their entireties.

BACKGROUND

Field

The disclosure relates to an electronic device including a piezoelectric element, and a method for detecting a touch input using the piezoelectric element.

Description of Related Art

In line with recent technical development, electronic devices have evolved from unilateral rectangular shapes to more diversified shapes. As an example, an electronic device may include a small-sized tag device. The tag device may be fabricated such that the same can be mounted on an object (for example, a bag or a bicycle). The tag device may communicate with an external electronic device while being mounted on the object. For example, the tag device may communicate with an external electronic device so as to transmit position information. The tag device may communicate with an external electronic device so as to transmit position information and, based on identifying a state of missing, may output a notification regarding the state of missing using a piezoelectric element included in the tag device. In addition to the above-described function, the tag device may include a touch key, and may control the function of the external electronic device having a communication connection thereto through an input using the touch key.

The above-described information may be provided as a related art for helping the understanding of the disclosure. No assertion or determination is made regarding whether any of the above description may be applied as a prior art related to the disclosure.

However, an electronic device such as a tag device needs to have a small size such that the same can be mounted on an object, but a touch key included therein may increase the volume of the electronic device, thereby degrading the usability in terms of portability.

SUMMARY

Embodiments of the disclosure may use a metal portion formed on a surface of a piezoelectric element included in the electronic device as a touch key. For example, the electronic device may include: a sound output circuit, a touch sensing circuit, and a switching circuit. The electronic device may control the switching circuit such that the piezoelectric element and the touch sensing circuit are electrically connected according to the situation of the electronic device, thereby detecting touch inputs made on the piezoelectric element through the touch sensing circuit, or may control the switching circuit such that the piezoelectric element and the sound output circuit are electrically connected, thereby outputting sounds generated by vibrations of the piezoelectric element through the sound output circuits.

Embodiments of the disclosure may adjust the cycle at which touch inputs on the piezoelectric element are scanned through the touch sensing circuit, based on whether a touch input is detected through the touch sensing circuit, in a state in which the piezoelectric element and the touch sensing circuit are electrically connected.

An electronic device according to an example embodiment of the disclosure may include: a housing and a piezoelectric element comprising a piezoelectric material disposed to one surface of the housing in an inner space of the housing; a short-range communication circuit, a sound output circuit, and a touch sensing circuit. The electronic device according to an embodiment may include at least one switching circuit configured to control the electric connection between the piezoelectric element and the sound output circuit or the electric connection between the piezoelectric element and the touch sensing circuit. The electronic device according to an example embodiment may include at least one processor, comprising processing circuitry, operatively connected to the piezoelectric element, the short-range communication circuit, the sound output circuit, the touch sensing circuit, and the at least one switching circuit. In an example embodiment, at least one processor, individually and/or collectively, may be configured to: based on a communication connection to an external electronic device being established through the short-range communication circuit in a state in which the piezoelectric element and the sound output circuit are electrically connected, control the at least one switching circuit such that the piezoelectric element and the touch sensing circuit are electrically connected; based on a touch input being detected from the piezoelectric element through the touch sensing circuit, control the at least one switching circuit such that the piezoelectric element and the sound output circuit are electrically connected, and may output a sound through the sound output circuit; and control the at least one switching circuit such that the piezoelectric element and the touch sensing circuit are electrically connected, after outputting the sound.

A method for detecting a touch input using a piezoelectric element of an electronic device according to an example embodiment of the disclosure may include: based on a communication connection to an external electronic device being established through a short-range communication circuit in a state in which the piezoelectric element and a sound output circuit are electrically connected, controlling at least one switching circuit such that the piezoelectric element and a touch sensing circuit are electrically connected; based on a touch input being detected from the piezoelectric element through the touch sensing circuit, controlling the at least one switching circuit such that the piezoelectric element and the sound output circuit are electrically connected, and outputting a sound through the sound output circuit; and controlling the at least one switching circuit such that the piezoelectric element and the touch sensing circuit are electrically connected, after outputting the sound.

According to an example embodiment of the disclosure, a non-transitory computer-readable storage medium (or a computer program product) storing one or more programs may be provided. One or more programs according to an embodiment may include instructions which, when executed by at least one processor, comprising processing circuitry, individually and/or collectively, of an electronic device, cause the electronic device to: control at least one switching circuit such that a piezoelectric element and a touch sensing circuit are electrically connected based on a communication connection to an external electronic device being established through a short-range communication circuit in a state in which the piezoelectric element and a sound output circuit are electrically connected; control the at least one switching circuit such that the piezoelectric element and the sound output circuit are electrically connected based on a touch input being detected from the piezoelectric element through the touch sensing circuit, and output a sound through the sound output circuit; and control the at least one switching circuit such that the piezoelectric element and the touch sensing circuit are electrically connected, after outputting the sound.

An electronic device according to an example embodiment of the disclosure may control the switching circuit such that the piezoelectric element and the touch sensing circuit are electrically connected according to the situation of the electronic device, thereby detecting a touch input on the piezoelectric element through the touch sensing circuit, or may control the switching circuit such that the piezoelectric element and the sound output circuit are electrically connected and may output sounds generated by vibrations of the piezoelectric element through the sound output circuit, thereby performing a sound output function and a touch input detecting function through the piezoelectric element. The electronic device may have improved usability in terms of the portability of the electronic device and the functionality thereof as the electronic device can perform a sound output function and a touch input detecting function using the piezoelectric element.

An electronic device according to an example embodiment of the disclosure may adjust the cycle at which touch inputs on the piezoelectric element are scanned through the touch sensing circuit to be longer than a designated cycle in case that no touch input is detected through the touch sensing circuit in a state in which the piezoelectric element and the touch sensing circuit are electrically connected. The amount of current consumed by the touch input scanning operation may be reduced by adjusting the cycle at which touch inputs are scanned to be longer than the designated cycle in case that no touch input is detected through the touch sensing circuit.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 1 is a block diagram illustrating an example electronic device in a network environment according to various embodiments;

FIG. 2A is a perspective view illustrating an example electronic device according to various embodiments;

FIG. 3 is a magnified sectional view of a partial area in the inner space of the electronic device in FIG. 2B according to various embodiments;

FIG. 5A and FIG. 5B are circuit diagrams illustrating a sound output circuit, a touch sensing circuit, and at least one switching circuit according to various embodiments;

DETAILED DESCRIPTION

Figure 2B:
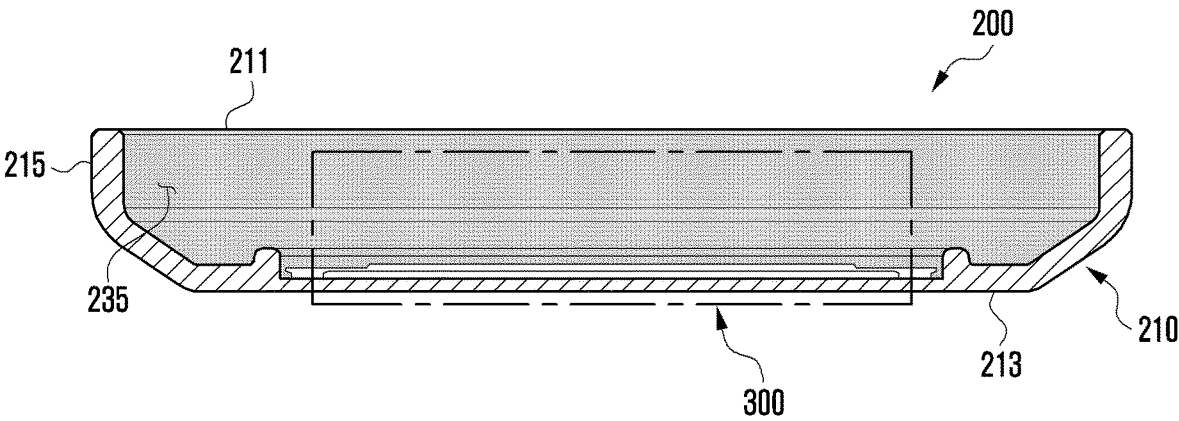
FIG. 2B is a cross-sectional view of the electronic device taken along line 2*b*-2*b*' in FIG. 2A according to various embodiments.

Hereinafter, various example embodiments of the disclosure will be described in greater detail with reference to the drawings. However, the disclosure may be implemented in various different forms, is are not limited to the various example embodiments described herein. In relation to descriptions of the drawings, identical or similar components may be given identical or similar reference numerals. In addition, in the drawings and related descriptions, descriptions of widely known functions and components may be omitted for clarity and brevity.

FIG. 1 is a block diagram illustrating an example electronic device 101 in a network environment 100 according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2A perspective view illustrating an example electronic device 200 according to various embodiments. FIG. 2B is a cross-sectional view of the electronic device 200 taken along line 2*b*-2*b*' in FIG. 2A according to various embodiments.

The electronic device 200 in FIG. 2A and FIG. 2B according to various embodiments may be at least partially similar to the electronic device 101 in FIG. 1, or may further include various embodiments of the electronic device.

The electronic device 200 according to various embodiments may include a small position tracking device (for example, a tag device) fabricated such that the same can be mounted on an object (for example, a bag or a bicycle).

Referring to FIG. 2A, the electronic device 200 may include a housing 210 including a first surface 211, a second surface 213 facing in the opposite direction of the first surface 211, and/or a lateral surface 215 surrounding at least a part of the space 235 between the first surface 211 and the second surface 213. In an embodiment (not illustrated), the housing 210 may refer to a structure that forms at least some of the first surface 211, the second surface 213, and the lateral surface 215. In an embodiment, the housing 210 may be made of a plastic injection-molded material.

In an embodiment, the electronic device 200 may include a cover 220 disposed on the first surface 211 of the housing 210. In an embodiment, the cover 220 may be attachable/detachable.

For example, reference numeral <205> in FIG. 2A illustrates a state in which the cover 220 is attached, and reference numeral <230> in FIG. 2A and FIG. 2B illustrate a state in which the cover 220 is detached.

In an embodiment, a battery (for example, the battery 189 in FIG. 1 or the battery 325 in FIG. 3), a printed circuit board (PCB) (for example, the PCB 320 in FIG. 3), and/or a piezoelectric element 240 may be disposed in a partial area 300 in the inner space 235 of the housing 210. However, the disclosure is not limited thereto.

The components disposed in the partial area 300 in the inner space 235 of the housing 210 according to various embodiments will be described in greater detail below with reference to FIG. 3.

FIG. 3 is a magnified cross-sectional view of the partial area 300 in the inner space 235 of the electronic device 200 in FIG. 2B according to various embodiments.

Referring to FIG. 3, the electronic device (for example, the electronic device 200 in FIG. 2A and FIG. 2B) may include a housing (for example, the housing 210 in FIG. 2A and FIG. 2B) including a first surface (for example, the first surface 211 in FIG. 2A and FIG. 2B), a second surface (for example, the second surface 213 in FIG. 2A and FIG. 2B) facing in the opposite direction of the first surface 211, and/or a lateral surface (for example, the lateral surface 215 in FIG. 2A and FIG. 2B) surrounding at least a part of the space 235 between the first surface 211 and the second surface 213. In the inner space 235 of the housing 210, a battery 325, a printed circuit board 320, and/or a piezoelectric element 240 may be included.

Referring to reference numeral <310> according to an embodiment, the electronic device 200 may include a printed circuit board 320 disposed in the inner space 235 of the housing 210. On the printed circuit board 320, a short-range communication circuit (for example, the communication module 190 in FIG. 1), a memory (for example, the memory 130 in FIG. 1), a sound output circuit (for example, the sound output module 155 in FIG. 1), a touch sensing circuit, a switching circuit, and/or a processor (for example, the processor 120 in FIG. 1) may be disposed. However, the disclosure is not limited thereto, and a sensor circuit (for example, the sensor module 176 in FIG. 1) may be further disposed on the printed circuit board 320.

In an embodiment, a battery 325 (for example, the battery 189 in FIG. 1) may be disposed on the upper portion (for example, direction ②) of the printed circuit board 320. In an embodiment, the battery 325 is a device for supplying power to at least one component of the electronic device 200 and may include, for example, a primary cell which is not rechargeable, a secondary battery which is rechargeable, or a fuel cell. The battery 325 may be disposed such that the same can be attached to/detached from the electronic device 200. The disclosure is not so limited, and the battery 325 may be integrally disposed inside the electronic device 200.

In an embodiment, a piezoelectric element 240 may be included on the lower portion (for example, direction ①) of the printed circuit board 320. In an embodiment, the piezoelectric element 240 may be made of ceramic and/or metal (for example, aluminum (Al), stainless steel (STS), zinc (Zn), and/or copper (Cu)).

In an embodiment, although not illustrated, the electronic device 200 may include a support plate disposed on the lower portion (for example, direction ①) of the battery 325. The support plate (not illustrated) may be formed to have a material and a shape configured to support the battery 325.

In an embodiment, the piezoelectric element 240 may have a circular shape. However, the disclosure is not limited thereto. In an embodiment, the piezoelectric element 240 may be disposed to one surface 311 of the inner space 235 corresponding to the second surface 213 of the housing 210. In an embodiment, the piezoelectric element 240 may be attached to one surface 311 of the inner space 235 corresponding to the second surface 213 of the housing 210 through an attachment member. The attachment member may include a double-sided tape. However, the disclosure is not limited thereto. For example, a double-sided tape 315 may be attached to the edge of a surface (for example, a surface facing in direction ①) of the piezoelectric element 240. Through the double-sided tape 315, the piezoelectric element may be attached to at least a part of one surface 311 of the inner space 235 corresponding to the second surface 213 of the housing 210.

In an embodiment, the double-sided tape 315 (attachment member) may play the role of a medium that transfers vibrations between the piezoelectric element 240 and the second surface 213 of the housing 210 made of a plastic material. In consideration thereof, the thickness of the second surface 213 of the housing 210 and the thickness of the piezoelectric element 240 may be determined to facilitate touch detection and/or vibration transfer. For example, the second surface 213 of the housing 210 may have a thickness of about 0.4 t, and the double-sided tape 315 may have a thickness of about 0.1 t. However, the disclosure is not limited thereto.

In an embodiment, the second surface 213 of the electronic device 200 may have a speaker hole 330 formed therein. For example, the speaker hole 330 may be used as an external speaker.

In an embodiment, the piezoelectric element 240 may be electrically connected to the sound output circuit or the touch sensing circuit under the control of the processor 120. In an embodiment, in case that the piezoelectric element 240 is electrically connected to the sound output circuit, the processor 120 may cause the piezoelectric element 240 to vibrate through the sound output circuit and may output sounds through the speaker hole 330. As another example, in case that the piezoelectric element 240 is electrically connected to the touch sensing circuit, the processor 120 may detect touch inputs on the piezoelectric element 240 through the touch sensing circuits.

Although it has been described in connection with reference numeral <310> according to various embodiments that a battery 325, a printed circuit board 320, and a piezoelectric element 240 are disposed in a stacking structure in the inner space 235 of the housing 210, and that the second surface 213 of the housing 210 has a speaker hole 330 formed therein, the disclosure is not limited thereto. This will be described later in connection with reference numeral <350>.

In connection with describing components illustrated in reference numeral <350>, components substantially identical to those described above with reference to reference numeral <310> are given identical reference numerals, and detailed descriptions thereof may not be repeated here.

Referring to reference numeral <350> according to an embodiment, the printed circuit board 320 may be may be substantially disposed on the same plane as the battery 325.

In an embodiment, the piezoelectric element 240 may be attached to one surface 311 of the inner space 235 corresponding to the second surface 213 of the housing 210 through an attachment member. For example, the attachment member may include a double-sided tape. In an embodiment, a double-sided tape 315 may be attached to one surface (for example, a surface facing in direction ①) of the piezoelectric element 240. Through the double-sided tape 315, the piezoelectric element 240 may be attached to at least a part of one surface 311 of the inner space 235 corresponding to the second surface 213 of the housing 210.

Figure 4:
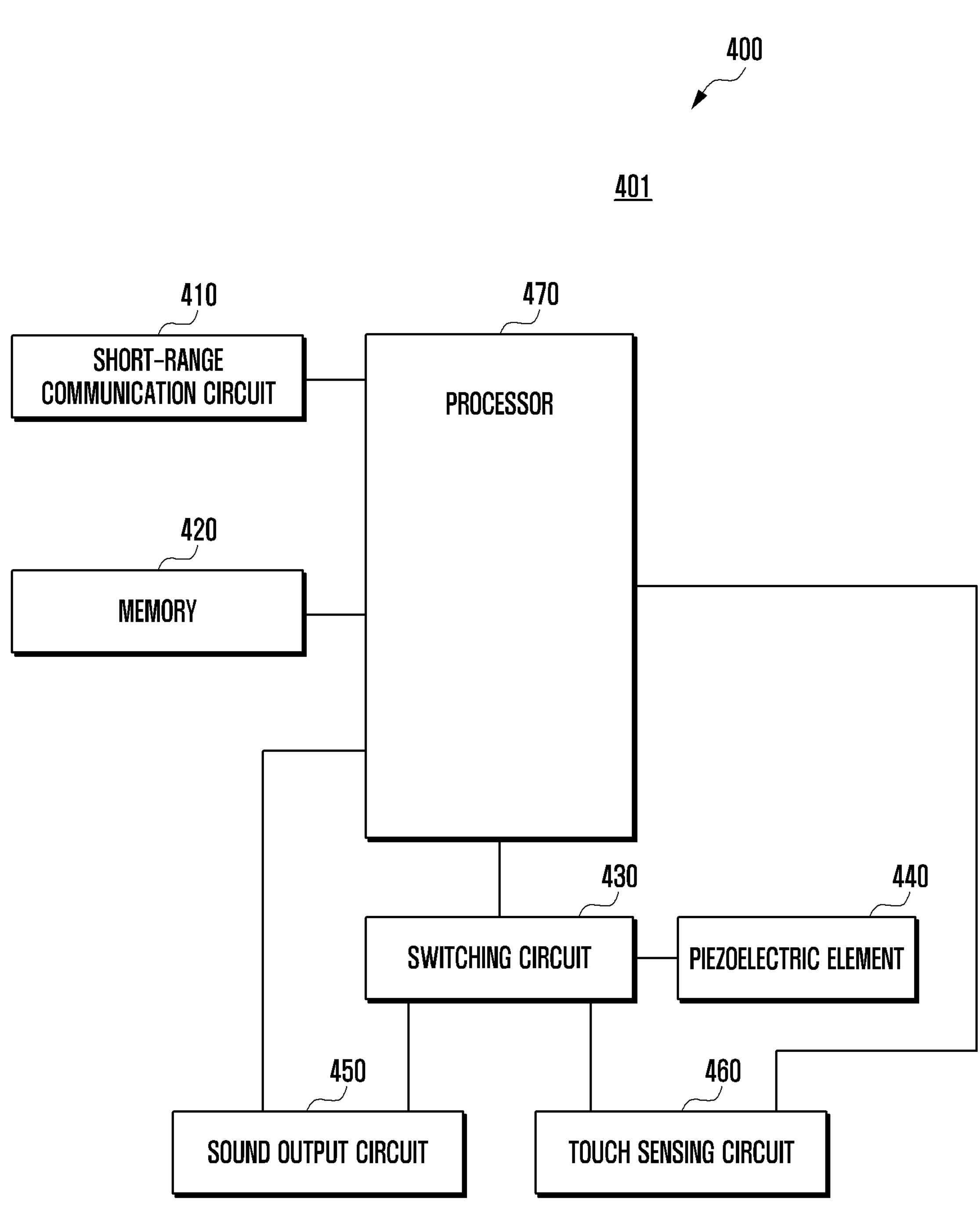
FIG. 4 is a block diagram illustrating an example configuration electronic device according to various embodiments.

FIG. 4 is a block diagram 400 illustrating an example configuration of an electronic device 401 according to various embodiments.

Referring to FIG. 4, the electronic device 401 (for example, the electronic device 101 in FIG. 1 or the electronic device 200 in FIG. 2A to FIG. 3) may include a short-range communication circuit 410 (for example, the communication module 190 in FIG. 1), a memory 420 (for example, the memory 130 in FIG. 1), a switching circuit 430, a piezoelectric element (e.g., including a piezoelectric material) 440 (for example, the piezoelectric element 240 in FIG. 2A and FIG. 3), a sound output circuit 450 (for example, the sound output module 155 in FIG. 1), a touch sensing circuit 460, and/or a processor (e.g., including processing circuitry) 470 (for example, the processor 120 in FIG. 1).

According to various embodiments, the short-range communication circuit 410 (for example, the communication module 190 in FIG. 1) may establish a communication channel with an external electronic device (for example, the electronic device 102 or the sever 108 in FIG. 1) and may support transmission/reception of various pieces of data with the external electronic device.

In an embodiment, the short-range communication circuit 410 may include, for example, and without limitation, at least one of Bluetooth, Bluetooth low energy (BLE), ultra-wideband (UWB), Wi-Fi, or the like.

According to various embodiments, the memory 420 (for example, the memory 130 in FIG. 1) may store programs for processing and control of the processor 470 (for example, the program 140 in FIG. 1), an operating system (OS) (for example, the OS 142 in FIG. 1), various applications, and/or programs which perform input/output data storing functions, and which control overall operations of the electronic device 401. The memory 420 may store various instructions that may be performed by the processor 470.

In an embodiment, the memory 420 store instructions for controlling the switching circuit 430 such that the piezoelectric element 440 and the touch sensing circuit 460 are electrically connected, based on a communication connection established between an external electronic device and the short-range communication circuit 410, under the control of the processor 470. The memory 420 may store instructions for outputting sounds through the sound output circuit 450 by controlling the switching circuit 430 such that the piezoelectric element 440 and the sound output circuit 450 are electrically connected, in case that a touch input is detected through the touch sensing circuit 460, under the control of the processor 470. The memory 420 may store instructions for transmitting, if a touch input is detected through the touch sensing circuit 460, a signal related to the detected touch input to an external electronic device under the control of the processor 470.

In an embodiment, the memory 420 may store instructions for adjusting the cycle at which touch inputs on the piezoelectric element 440 are scanned through the touch sensing circuit 460, based on whether touch inputs are detected through the touch sensing circuit 460, under the control of the processor 470.

In an embodiment, the memory 420 may store instructions for controlling the switching circuit 430 such that the piezoelectric element 440 and the sound output circuit 450 are electrically connected, if the communication connection to the external electronic device is released, or if a signal related to sound output is received, under the control of the processor 470. The memory 420 may store instructions for causing the electronic device 440 and thus outputting sounds through the sound output circuit 450, if a signal related to sound output is received, under the control of the processor 470.

According to various embodiments, the switching circuit 430 may electrically connect the piezoelectric element 440 and the sound output circuit 450 under the control of the processor 470, or may electrically connect the piezoelectric element 440 and the touch sensing circuit 460.

According to various embodiments, the piezoelectric element 440 (for example, the piezoelectric element 240 in FIG. 2A and FIG. 3) may be attached to one surface 311 of the inner space 235 corresponding to the second surface 213 of the housing 210 through an attachment member (for example, the attachment member 315 in FIG. 3) in the inner space (for example, the inner space 235 in FIG. 2A to FIG. 3) of the housing 210 of the electronic device 401.

In an embodiment, the piezoelectric element 440 may be used to output sounds in case that the same is electrically connected to the sound output circuit 450 under the control of the processor 470.

In an embodiment, the piezoelectric element 440 may be used to detect touch inputs in case that the same is electrically connected to the touch sensing circuit 460 under the control of the processor 470.

According to various embodiments, the sound output circuit 450 (for example, the sound output module 155 in FIG. 1) may cause the piezoelectric element 440 to vibrate under the control of the processor 470.

According to various embodiments, the touch sensing circuit 460 may detect a change in capacitance caused by a conductive object (for example, finger) that contacts the piezoelectric element 440. The touch sensing circuit 460 may transfer information regarding the detected change in capacitance to the processor 470.

According to various embodiments, the processor 470 may include various processing circuitry, including, for example, a micro controller unit (MCU), for example, and may drive the OS or embedded software program so as to control multiple hardware components connected to the processor 470. The processor 470 may control multiple hardware components according to instructions (for example, the program 140 in FIG. 1) stored in the memory 420, for example. The processor 470 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In an embodiment, in a state in which the piezoelectric element 440 and the sound output circuit 450 are electrically connected, the processor 470 may identify whether a connection to an external electronic device is established through the short-range communication circuit 410. For example, in case that the electronic device 401 is positioned within a designated distance from the external electronic device, the processor 470 may establish a communication connection to the external electronic device through the short-range communication circuit 410. In case that a communication connection to the external electronic device is established through the short-range communication circuit 410, the processor 470 may control the switching circuit 430 such that the piezoelectric element 440 and the touch sensing circuit 460 are electrically connected.

In an embodiment, the processor 470 may identify whether a touch input is detected on the piezoelectric element 440 through the touch sensing circuit 460. In case that a touch input is detected through the touch sensing circuit 460, the processor 470 may control the switching circuit 430 such that the piezoelectric element 440 and the sound output circuit 450 are electrically connected. The processor 470 may cause the piezoelectric element 440 to vibrate and thus output sounds through the sound output circuit 450. For example, upon detecting a change in capacitance caused by a conductive object (for example, finger) that contacts the piezoelectric element 440 through the touch sensing circuit 460, the processor 470 may determine (or identify) that a touch input has been detected from the piezoelectric element 440. Based on determining (or identifying) that a touch input has been detected from the piezoelectric element 440, the processor 470 may control the switching circuit 430 such that the piezoelectric element 440 and the sound output circuit 450 are electrically connected.

In an embodiment, upon detecting a touch input on the piezoelectric element 440 through the touch sensing circuit 460, the processor 470 may transmit a signal related to the touch input to the external electronic device such that the external electronic device performs the function corresponding to the detected touch input.

In an embodiment, sounds output through the sound output circuit 450 may include a sound output to identify (or inform) that a touch input has been detected and/or a sound for identifying (or informing) a function performed by the external electronic device or by an IoT device having a communication connection to the external electronic device.

In an embodiment, the processor 470 may control the switching circuit 430 such that the piezoelectric element 440 and the touch sensing circuit 460 are electrically connected after sounds are output through the sound output circuit 450.

In an embodiment, if a touch input is detected on the piezoelectric element 440 through the touch sensing circuit 460 in a state in which the piezoelectric element 440 and the touch sensing circuit 460 are electrically connected, the processor 470 may configure the cycle at which touch inputs are scanned through the touch sensing circuit 460 to be a first cycle (for example, about 100 ms). After configuring the cycle at which touch inputs are scanned through the touch sensing circuit 460 to be the first cycle (for example, about 100 ms), the processor 470 may identify whether a touch input is detected on the piezoelectric element 440 through the touch sensing circuit 460 and, if there is still no touch input is detected on the piezoelectric element 440, the processor 470 may configure the cycle at which touch inputs are scanned through the touch sensing circuit 460 to be a second cycle (for example, about 200 ms) which is longer than the first cycle (for example, about 100 ms). After configuring the cycle at which touch inputs are scanned through the touch sensing circuit 460 to be the second cycle (for example, about 200 ms), the processor 470 may identify whether a touch input is detected on the piezoelectric element 440 and, upon identifying a touch input detected on the piezoelectric element 440, the processor 470 may configure the cycle at which touch inputs are scanned through the touch sensing circuit 460 to be a the first cycle (for example, about 100 ms) which is shorter than the second cycle (for example, about 200 ms).

In an embodiment, in case that there is no communication connection to the external electronic device established through the short-range communication circuit 410 in a state in which the piezoelectric element 440 and the sound output circuit 450 are electrically connected, the processor 470 may maintain the electric connection between the piezoelectric element 440 and the sound output circuit 450.

An electronic device according to various example embodiments may include: a housing and a piezoelectric element disposed to one surface of the housing in an inner space of the housing; a short-range communication circuit; a sound output circuit; a touch sensing circuit; at least one switching circuit configured to control the electric connection between the piezoelectric element and the sound output circuit or the electric connection between the piezoelectric element and the touch sensing circuit; at least one processor, comprising processing circuitry, operatively connected to the piezoelectric element, the short-range communication circuit, the sound output circuit, the touch sensing circuit, and the at least one switching circuit, wherein at least one processor, individually and/or collectively, may be configured to: based on a communication connection to an external electronic device being established through the short-range communication circuit in a state in which the piezoelectric element and the sound output circuit are electrically connected, control the at least one switching circuit such that the piezoelectric element and the touch sensing circuit are electrically connected; based on a touch input being detected from the piezoelectric element through the touch sensing circuit, control the at least one switching circuit such that the piezoelectric element and the sound output circuit are electrically connected, and may output a sound through the sound output circuit; and control the at least one switching circuit such that the piezoelectric element and the touch sensing circuit are electrically connected, after outputting the sound through the sound output circuit.

In an example embodiment, at least one processor, individually and/or collectively, may be configured to: determine that a touch input is detected from the piezoelectric element based on a change in capacitance being detected through the touch sensing circuit as a result of a contact between a conductive object and the piezoelectric element in a state in which the piezoelectric element and the touch sensing circuit are electrically connected.

In an example embodiment, at least one processor, individually and/or collectively, may be configured to: based on a touch input being detected from the piezoelectric element through the touch sensing circuit, control the electronic device transmit a signal related to the touch input to the external electronic device through the short-range communication circuit such that the external electronic device or an Internet-of-things (IoT) device having a communication connection to the external electronic device performs a function corresponding to the detected touch input.

In an example embodiment, sounds output through the sound output circuit may include at least one of a sound output identifying that the touch input has been detected from the piezoelectric element, and a sound for identifying a function performed by the external electronic device or the IoT device having a communication connection to the external electronic device.

In an example embodiment, at least one processor, individually and/or collectively, may be configured to: based on a sound output-related signal being received from the external electronic device through the short-range communication circuit, control the at least one switching circuit such that the piezoelectric element and the sound output circuit are electrically connected, and output a sound related to the signal received from the external electronic device through the sound output circuit.

In an example embodiment, the sound output-related signal may include a signal requesting a sound output for identifying the position of the electronic device.

In an example embodiment, at least one processor, individually and/or collectively, may be configured to: based on the touch input not being detected from the piezoelectric element through the touch sensing circuit, configure the cycle at which the touch input is scanned through the touch sensing circuit to be a first cycle.

In an example embodiment, at least one processor, individually and/or collectively, may be configured to: based on the touch input not being detected from the piezoelectric element through the touch sensing circuit in a state in which the cycle at which the touch input is scanned through the touch sensing circuit is configured to be the first cycle, configure the cycle at which the touch input is scanned through the touch sensing circuit to be a second cycle longer than the first cycle.

In an example embodiment, at least one processor, individually and/or collectively, may be configured to: based on the touch input being detected from the piezoelectric element through the touch sensing circuit in a state in which the cycle at which the touch input is scanned through the touch sensing circuit is configured to be the second cycle, configure the cycle at which the touch input is scanned through the touch sensing circuit to be the first cycle shorter than the second cycle.

In an example embodiment, at least one processor, individually and/or collectively, may be configured to maintain the electric connection between the piezoelectric element and the sound output circuit based on no connection to an external electronic device being established through the short-range communication circuit.

In an example embodiment, at least one processor, individually and/or collectively, may be configured to: identify whether the communication connection to the external electronic device has been released; and based on identifying that the communication connection to the external electronic device has been released, control the at least one switching circuit such that the piezoelectric element and the sound output circuit are electrically connected.

In an example embodiment, the electronic device may include a position tracking device mountable on an object.

Figure 5A:
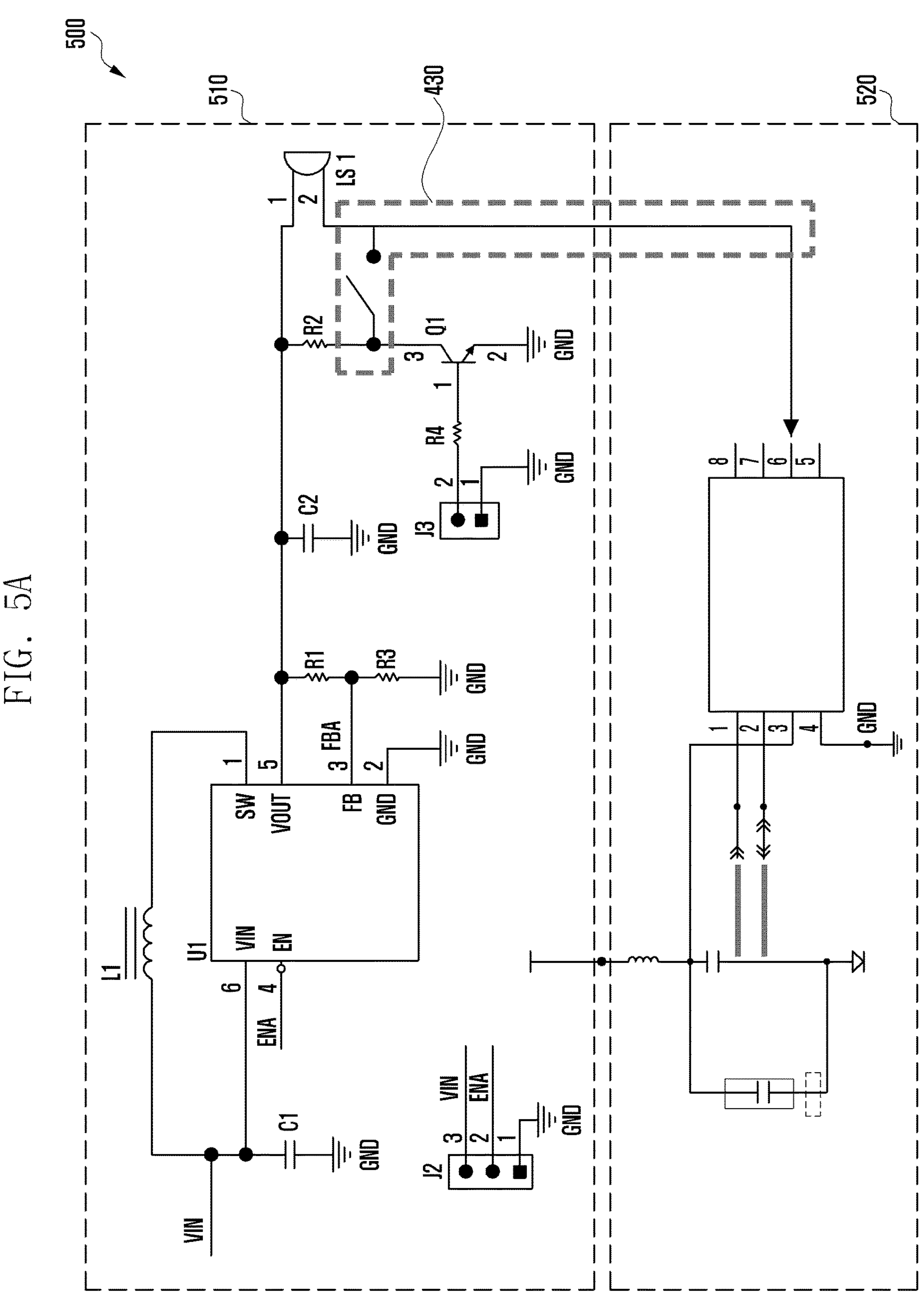
Figure 5B:
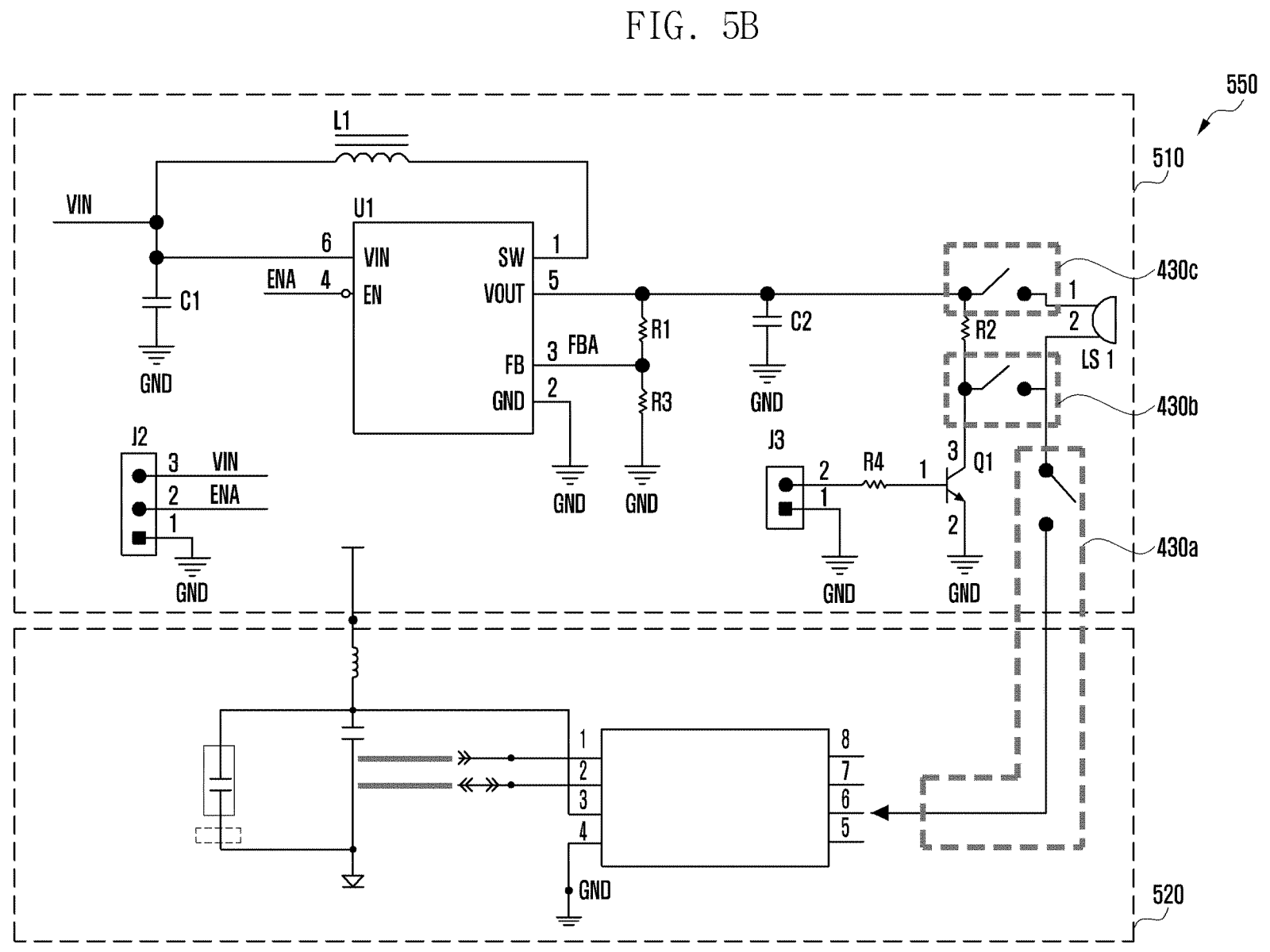

FIG. 5A and FIG. 5B are circuit diagrams 500 and 550 illustrating a sound output circuit 450, a touch sensing circuit 460, and at least one switching circuit 430 according to various embodiments.

Referring to FIG. 5A and FIG. 5B, reference numeral <510> may indicate the circuit diagram of a sound output circuit (for example, the sound output circuit 450 in FIG. 4), and reference numeral <520> may indicate the circuit diagram of a touch sensing circuit (for example, the touch sensing circuit 460 in FIG. 4).

The circuit diagram of the sound output circuit 450 and the circuit diagram of the touch sensing circuit 460 indicated by reference numeral <510> and reference numeral <520> in FIG. 5A and FIG. 5B according to various embodiments are only examples for describing the disclosure, which is not limited to the circuit diagrams illustrated in FIG. 5A and FIG. 5B.

As illustrated in FIG. 5A according to an embodiment, the electronic device (for example, the electronic device 401 in FIG. 4) may include a switching circuit 430. The switching circuit 430 may electrically connect a piezoelectric element (for example, the piezoelectric element 440 in FIG. 4) and the sound output circuit 450 under the control of a processor (for example, the processor 470 in FIG. 4), or may electrically connect the piezoelectric element 440 and the touch sensing circuit 460.

For example, if a communication connection to an external electronic device is established through a short-range communication circuit (for example, the short-range communication circuit 410 in FIG. 4), the processor 470 may control the switching circuit 430 to be turned on (for example, short-circuited state), thereby electrically connecting the piezoelectric element 440 and the touch sensing circuit 460.

As another example, if the communication connection to an external electronic device is released, or if a sound output-related signal is received, the processor 470 may control the switching circuit 430 to be turned off (for example, open state), thereby blocking the electric connection between the piezoelectric element 440 and the touch sensing circuit 460, and electrically connecting the piezoelectric element 440 and the sound output circuit 450.

Although it has been described with reference to FIG. 5A according to various embodiments that one switching circuit 430 is used to electrically connect the piezoelectric element 440 and the sound output circuit 450 or to electrically connect the piezoelectric element 440 and the touch sensing circuit 460, the disclosure is not so limited.

For example, as illustrated in FIG. 5B according to an embodiment, the electronic device 401 may include multiple switching circuits. For example, the multiple switching circuits may include a first switching circuit 430*a*, a second switching circuit 430*b*, and a third switching circuit 430*c*. However, the disclosure is not limited thereto.

In an embodiment, the multiple switching circuits may electrically connect the piezoelectric element 440 and the sound output circuit 450 or may electrically connect the piezoelectric element 440 and the touch sensing circuit 460 under the control of the processor 470.

For example, if a communication connection to an external electronic device is established through the short-range communication circuit 410, the processor 470 may control the second switching circuit 430*b* and the third switching circuit 430*c* to be turned off (for example, open state) and may control the first switching circuit 430*a* to be turned on (for example, short-circuited state), thereby electrically connecting the piezoelectric element 440 and the touch sensing circuit 460.

As another example, if the communication connection to an external electronic device is released, or if a sound output-related signal is received, the processor 470 may control the second switching circuit 430*b* and the third switching circuit 430*c* to be turned on (for example, short-circuited state) may control the first switching circuit 430*a* to be turned off (for example, open state), thereby blocking the electric connection between the piezoelectric element 440 and the touch sensing circuit 460, and electrically connecting the piezoelectric element 440 and the sound output circuit 450.

The switching circuit 430 illustrated in FIG. 5A according to various embodiments and the multiple switching circuits illustrated in FIG. 5B (for example, the first switching circuit 430*a*, the second switching circuit 430*b*, and the third switching circuit 430*c*) may include a metal oxide semiconductor field effect transistor (MOSFET) switching circuit or an analog switching circuit. However, the disclosure is not limited thereto.

Figure 6:
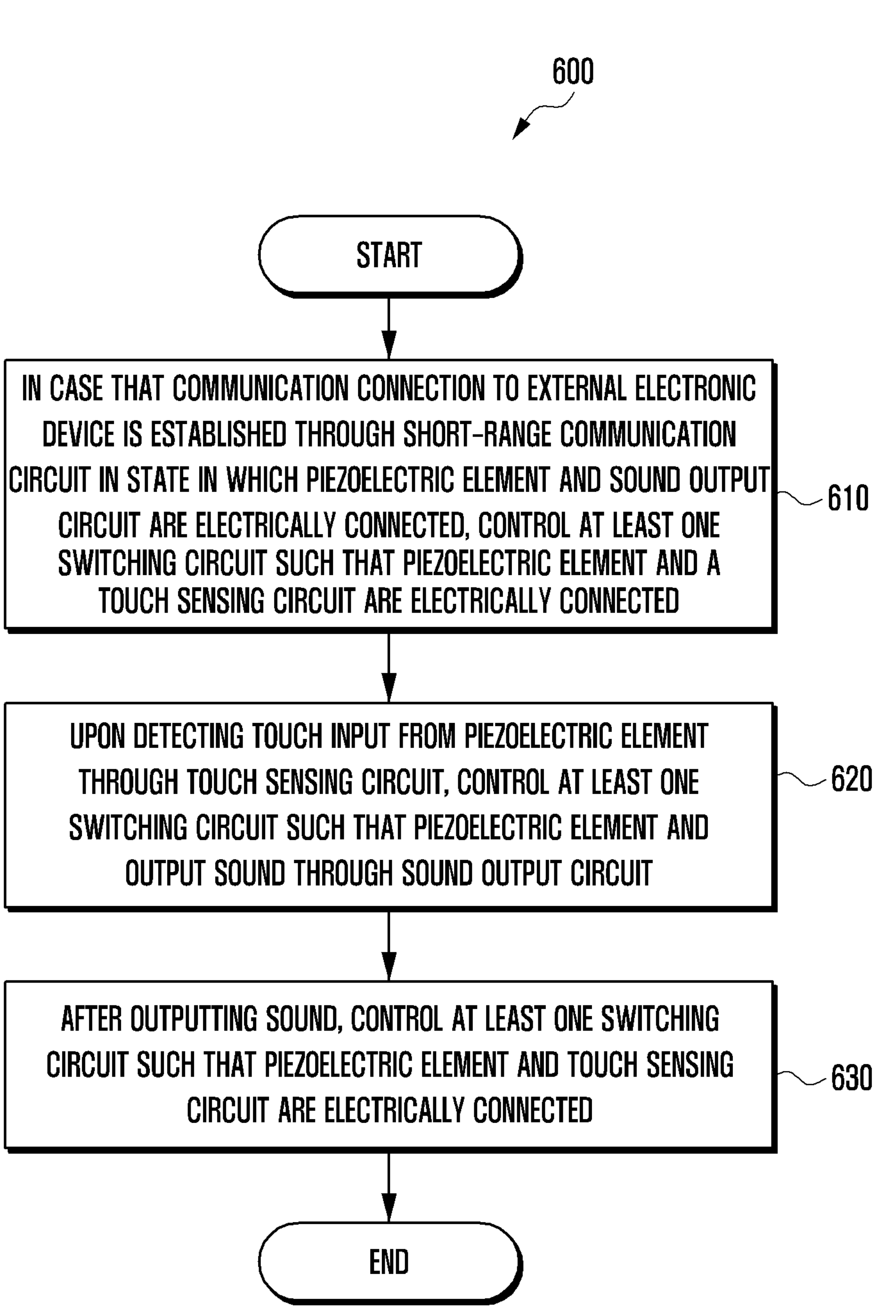
FIG. 6 is a flowchart illustrating an example method for controlling the electric connection between a piezoelectric element and a sound output circuit or the electric connection between a piezoelectric element and a touch sensing circuit according to various embodiments.

FIG. 6 is a flowchart 600 illustrating an example method for controlling the electric connection between a piezoelectric element 440 and a sound output circuit 450 or the electric connection between a piezoelectric element 440 and a touch sensing circuit 460 according to various embodiments.

In the following example, respective operations may be performed successively, but are not necessarily performed successively. For example, the order of respective operations may be changed, and at least two operations may be performed in parallel.

In an embodiment, it may be understood that operations 610 to 630 are performed by the processor (for example, the processor 470 in FIG. 4) of the electronic device (for example, the electronic device 401 in FIG. 4).

Prior to performing operation 610 described below in various embodiments, information of the electronic device 401 may already been stored in the memory of an external electronic device.

For example, the electronic device 401 may be a small position tracking device (for example, a tag device) which can be mounted on an object (for example, a bag or a bicycle). The external electronic device may be an electronic device such as a smartphone, or a wearable electronic device which can be worn on a part of the user's body, such as a smart watch.

In an embodiment, the external electronic device may share, in the memory thereof, information of the electronic device 401 received from the electronic device 401 through an operation of paring with the electronic device 401 using a short-range communication circuit with the electronic device 401. For example, information of the electronic device 401 may include the type of the electronic device 401 (for example, a tag device, a wearable electronic device, a tablet device, or a portable communication device (for example, a smartphone)), identity information (for example, identification (ID)), manufacturer information, hardware information (for example, processor performance, memory capacity, and/or battery capacity), and/or communication performance-related information (for example, whether short-range communication is supported or not).

In an embodiment, the electronic device 401 may be in a state in which the same is registered in the external electronic device (for example, in a state in which the same is stored in the memory of the external electronic device) as a device used to prevent and/or reduce or avoid the loss of the object on which the electronic device 401 is mounted, based on position information of the electronic device 401.

In an embodiment, the electronic device 401 may also store information of the external electronic device received from the external electronic device through pairing with the external electronic device using a short-range communication circuit (for example, the short-range communication circuit 410 in FIG. 4) in the memory (for example, the memory 420 in FIG. 4). The information of the external electronic device through may include the type of the external electronic device (for example, a tag device, a wearable electronic device, a tablet device, or a portable communication device (for example, a smartphone)), identity information (for example, ID), manufacturer information, hardware information (for example, processor performance, memory capacity, and/or battery capacity), and/or communication performance-related information (for example, whether short-range communication is supported or not).

Referring to FIG. 6, in operation 610, in case that a communication connection to an external electronic device is established through the short-range communication circuit 410 in a state in which a piezoelectric element (for example, the piezoelectric element 440 in FIG. 4) and a sound output circuit (for example, the sound output circuit 450 in FIG. 4) are electrically connected, the processor 470 may control at least one switching circuit (for example, the switching circuit 430 in FIG. 4) such that the piezoelectric element 440 and a touch sensing circuit (for example, the touch sensing circuit 460 in FIG. 4) are electrically connected.

In an embodiment, in a state in which the electronic device 401 is mounted on an object without a communication connection to the external electronic device, the piezoelectric element 440 and the sound output circuit 450 may be electrically connected. In case that the electronic device 401 has no communication connection to the external electronic device, the distance between the electronic device 401 and the external electronic device may exceed a designated distance, for example.

In an embodiment, according to a state in which the distance between the electronic device 401 and the external electronic device is within the designated distance, the electronic device 401 may have a communication connection to the external electronic device established through the short-range communication circuit 410. In case that the external electronic device and the electronic device 401 are connected through the short-range communication circuit 410, the electronic device 401 may be used as a device for controlling the external electronic device so as to perform a specific function. The disclosure is not so limited, and in case that the external electronic device and the electronic device 401 are connected through the short-range communication circuit 410, the electronic device 401 may be used as a device for controlling an Internet-of-things (IoT) device having a communication connection to the external electronic device so as to perform a specific function.

In an embodiment, the external electronic device may transmit a sound output-related signal to the electronic device 401. For example, the sound output-related signal may be a signal for requesting a sound output for identifying the position of the electronic device 401 (and/or the position of the object on which the electronic device 401 is mounted). Based on the sound output-related signal received from the external electronic device, the processor 470 may cause the piezoelectric element 440 and thus output sounds through the sound output circuit 450. As sounds are output through the sound output circuit 450, the user of the external electronic device may intuitively identify the position of the electronic device 401 and/or the position of the object on which the electronic device 401 is mounted.

In an embodiment, in case that a communication connection to the external electronic device is established through the short-range communication circuit 410, the processor 470 may control at least one switching circuit 430 such that the piezoelectric element 440 and the touch sensing circuit 460 are electrically connected, thereby identifying whether touch inputs are detected from the piezoelectric element 440. For example, the processor 470 may identify, through the touch sensing circuit 460, whether a change in capacitance is detected according to whether or not a conductive object (for example, a finger) contacts the piezoelectric element 440, thereby identifying whether touch inputs are detected from the piezoelectric element 440.

In an embodiment, in operation 620, upon detecting a touch input from the piezoelectric element 440 through the touch sensing circuit 460, the processor 470 may control at least one switching circuit 430 such that the piezoelectric element 440 and the sound output circuit 450 are electrically connected, and may output sounds through the sound output circuit 450.

In an embodiment, upon identifying that a change in capacitance is detected through the touch sensing circuit 460 as a conductive object (for example, a finger) contacts the piezoelectric element 440, the processor 470 may determine (or identify) that a touch input has been detected from the piezoelectric element 440.

In an embodiment, sounds output through the sound output circuit 450 may include a sound output to identify (or inform) that a touch input has been detected from the piezoelectric element 440. However, the disclosure is not limited thereto. In case that a touch input is detected, a sound may be output through the sound output circuit 450, and the user of the electronic device 401 may thus intuitively identify that a touch input has been detected.

In an embodiment, in operation 630, the processor 470 may control at least one switching circuit 430 such that the piezoelectric element 440 and the touch sensing circuit 460 are electrically connected, after outputting a sound.

In an embodiment, after controlling at least one switching circuit 430 such that the piezoelectric element 440 and the touch sensing circuit 460 are electrically connected, the processor 470 may repeatedly perform operations 620 and 630, based on detection of a touch input from the piezoelectric element 440.

Although not illustrated in various embodiments, upon detecting a touch input from the piezoelectric element 440 through the touch sensing circuit 460, the processor 470 may transmit a signal related to the touch input to the external electronic device through the short-range communication circuit 410 such that the external electronic device performs a function corresponding to the detected touch input. for example, the touch input may correspond to a specific function of the external electronic device. Based on determining (or identifying) that touch input is detected from the piezoelectric element 440, the processor 470 may transmit a signal related to the touch input to the external electronic device through the short-range communication circuit 410 such that the external electronic device performs a function corresponding to the detected touch input.

The disclosure is not so limited, and the touch input, for example, may correspond to a specific function of an Internet-of-things (IoT) device having a communication connection to the external electronic device. In this case, based on determining (or identifying) that touch input is detected from the piezoelectric element 440, the processor 470 may transmit a signal related to the touch input to the external electronic device through the short-range communication circuit 410 such that the IoT device having a communication connection to the external electronic device performs a function corresponding to the detected touch input.

According to an embodiment, in case that the above-described touch input-related signal is transmitted to the external electronic device, the sound output through the sound output circuit 450 in operation 630 may include a sound for identifying (or informing) a function performed by the external electronic device or an IoT device having a communication connection to the external electronic device. As the sound for identifying (or informing) a function performed by the external electronic device or an IoT device having a communication connection to the external electronic device is output through the sound output circuit 450, the user of the electronic device 401 may intuitively identify that a function is performed by the external electronic device or an IoT device having a communication connection to the external electronic device.

Although it has been described with reference to FIG. 6 according to various embodiments that, if a touch input is detected from the piezoelectric element 440 through the touch sensing circuit 460, the piezoelectric element 440 and the sound output circuit 450 are electrically connected such that sounds are output through the sound output circuit 450, the disclosure is not limited thereto.

For example, in a state in which the piezoelectric element 440 and the touch sensing circuit 460 are electrically connected, the processor 470 may receive a sound output-related signal from the external electronic device. The sound output-related signal may be a signal for requesting a sound output for identifying the position of the electronic device 401 (and/or the position of the object on which the electronic device 401 is mounted). Upon receiving the sound output-related signal from the external electronic device, the processor 470 may control at least one switching circuit 430 such that the piezoelectric element 440 and the sound output circuit 450 are electrically connected. Based on the sound output-related signal received from the external electronic device, the processor 470 may cause the piezoelectric element 440 and thus output sounds through the sound output circuit 450. After outputting sounds through the sound output circuit 450, the processor 470 may control at least one switching circuit 430 such that the piezoelectric element 440 and the touch sensing circuit 460 are electrically connected.

Figure 7:
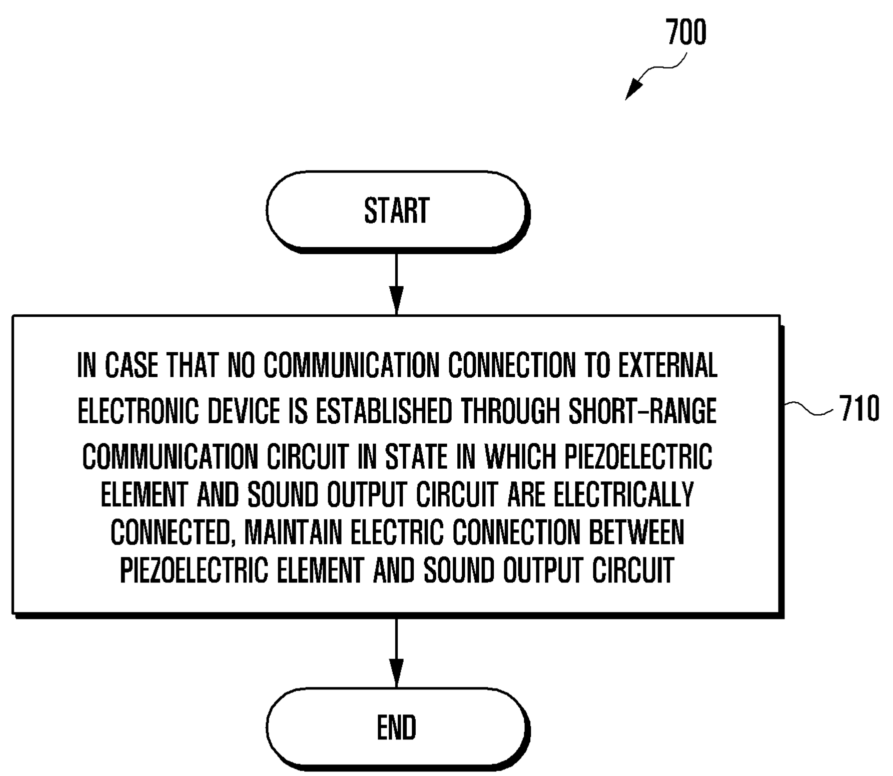
FIG. 7 is a flowchart illustrating an example method for controlling the electric connection between a piezoelectric element and a sound output circuit or the electric connection between a piezoelectric element and a touch sensing circuit according to various embodiments.

FIG. 7 is a flowchart 700 illustrating an example method for controlling the electric connection between a piezoelectric element 440 and a sound output circuit 450 or the electric connection between a piezoelectric element 440 and a touch sensing circuit 460 according to various embodiments.

In an embodiment, it may be understood that operation 710 is performed by the processor (for example, the processor 470 in FIG. 4) of the electronic device (for example, the electronic device 401 in FIG. 4).

FIG. 7 is a flowchart illustrating an example additional operation of above-described operation 610 in FIG. 6 according to various embodiments.

Referring to FIG. 7, in operation 710, in case that no communication connection to an external electronic device is established through a short-range communication circuit (for example, the short-range communication circuit 410 in FIG. 4) in a state in which a piezoelectric element (for example, the piezoelectric element 440 in FIG. 4) and a sound output circuit (for example, the sound output circuit 450 in FIG. 4) are electrically connected, the processor 470 may maintain the electric connection between the piezoelectric element 440 and the sound output circuit 450.

In case that the electronic device 401 has no communication connection to the external electronic device established through the short-range communication circuit 410 in a state in which the piezoelectric element 440 and the sound output circuit 450 are electrically connected, the distance between the electronic device 401 which is mounted on an object (for example, a bag or a bicycle), for example, and the external electronic device may exceed a designated distance.

Although it has been described with reference to FIG. 7 according to various embodiments that, in the absence of a communication connection to the external electronic device established through the short-range communication circuit 410, the piezoelectric element 440 and the sound output circuit 450 remain electrically connected, the disclosure is not so limited. For example, even in a state in which there is no communication connection to the external electronic device established through the short-range communication circuit 410, the processor 470 may control at least one switching circuit (for example, the switching circuit 430 in FIG. 4) such that the piezoelectric element 440 and a touch sensing circuit (for example, the touch sensing circuit 460 in FIG. 4) are electrically connected. In this case, the processor 470 may identify whether a touch input on the piezoelectric element 440 is detected through the touch sensing circuit 460. Upon detecting a touch input on the piezoelectric element 440 through the touch sensing circuit 460, the processor 470 may control at least one switching circuit 430 such that the piezoelectric element 440 and the sound output circuit 450 are electrically connected, and may output sounds through the sound output circuit 450. For example, sounds output through the sound output circuit 450 may include a sound output to identify (or inform) that a touch input has been detected from the piezoelectric element 440.

Figure 8:
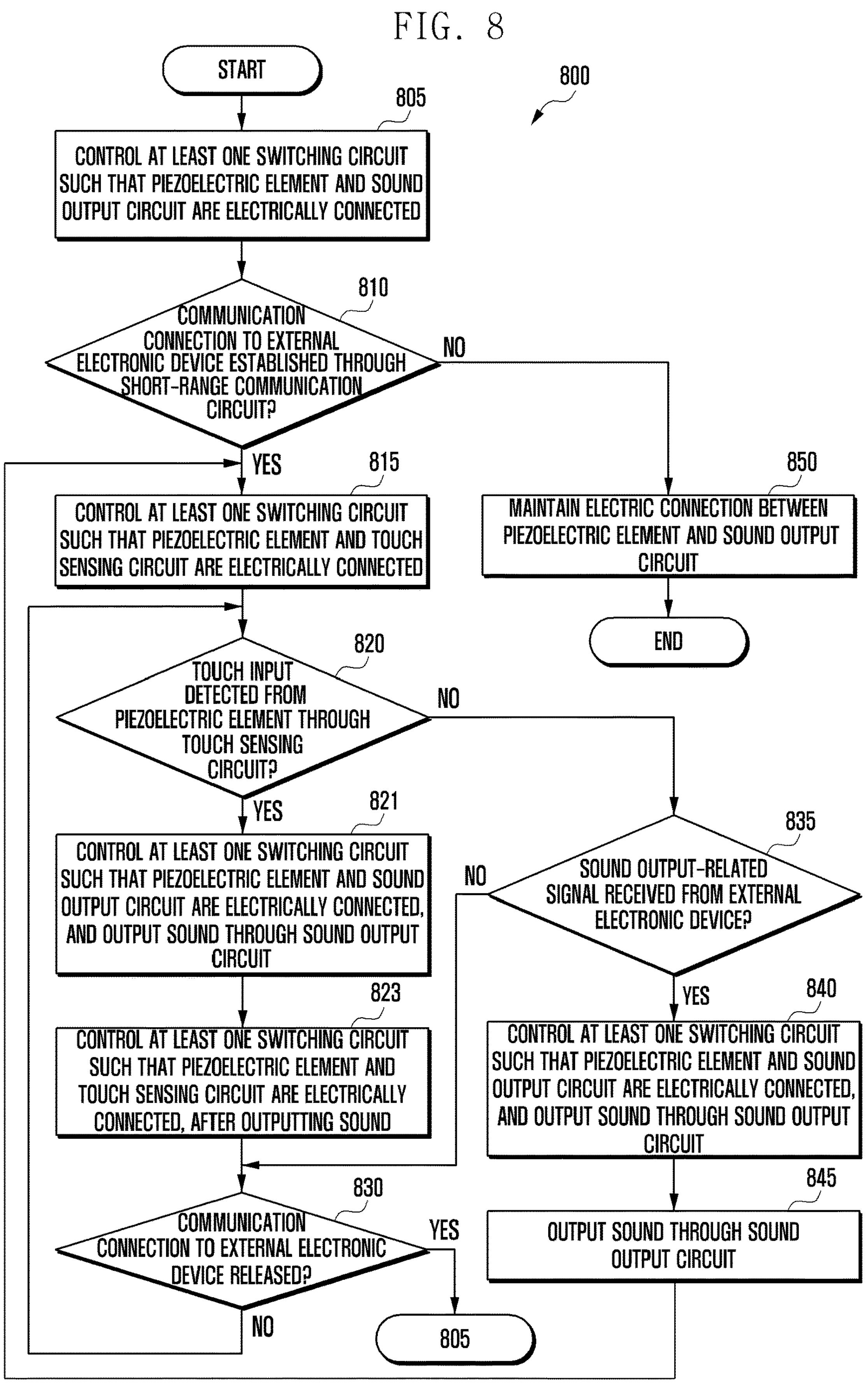
FIG. 8 is a flowchart illustrating example operations in FIG. 6 and FIG. 7 according to various embodiments.

FIG. 8 is a flowchart 800 illustrating example operations in FIG. 6 and FIG. 7 according to various embodiments.

In the following embodiment, respective operations may be performed successively, but are not necessarily performed successively. For example, the order of respective operations may be changed, and at least two operations may be performed in parallel.

In an embodiment, it may be understood that operations 805 to 850 are performed by the processor (for example, the processor 470 in FIG. 4) of the electronic device (for example, the electronic device 401 in FIG. 4).

Operations 805 to 823 and operations 835 to 845 in FIG. 8 according to various embodiments are identical to the above-described operations 610 to 630 in FIG. 6, and detailed descriptions thereof will not be repeated herein. In addition, operation 850 in FIG. 8 according to various embodiments is identical to the above-described operation 710 in FIG. 7, and detailed descriptions thereof will not be repeated herein.

Referring to FIG. 8, in operation 805, the processor 470 may control at least one switching circuit (for example, the switching circuit 430 in FIG. 4) such that the piezoelectric element (for example, the piezoelectric element 440 in FIG. 4) and the sound output circuit (for example, the sound output circuit 450 in FIG. 4) are electrically connected.

In an embodiment, the electronic device 401 may be a position tracking device (for example, a tag device) mounted on an object (for example, a bag or a bicycle). In this case, the electronic device 401 may be used to track the position of the object on which the electronic device 401 is mounted.

For example, the electronic device 401 may transmit the position information thereof to an external electronic device having a communication connection thereto, and the server may track the position of the electronic device 401 and/or the position of the object on which the electronic device 401 is mounted, using the position information of the electronic device 401.

In an embodiment, in operation 810, the processor 470 may identify whether a connection to an external electronic device is established through a short-range communication circuit (for example, the short-range communication circuit 410 in FIG. 4).

For example, the electronic device 401 may have a communication connection to an external electronic device through the short-range communication circuit 410 if the distance between the electronic device 401 and the external electronic device is within a designated distance.

In an embodiment, in case that a communication connection to an external electronic device is established through the short-range communication circuit 410 (YES in operation 810), the processor 470 may control at least one switching circuit 430 such that the piezoelectric element 440 and a touch sensing circuit (for example, the touch sensing circuit 460 in FIG. 4) are electrically connected in operation 815. In an embodiment, the processor 470 may identify whether a touch input is detected from the piezoelectric element 440 through the touch sensing circuit 460 in operation 820. Upon detecting a touch input from the piezoelectric element 440 through the touch sensing circuit 460 (YES in operation 820), the processor 470 may control at least one switching circuit 430 such that the piezoelectric element 440 and the sound output circuit 450 are electrically connected, and may then output sounds through the sound output circuit 450, operation 821. In this case, sounds output through the sound output circuit 450 may include a sound output to identify (or inform) that a touch input has been detected from the piezoelectric element 440.

In an embodiment, in operation 823, the processor 470 may control at least one switching circuit 430 such that the piezoelectric element 440 and the touch sensing circuit 460 are electrically connected, after outputting a sound.

For example, upon detecting a change in capacitance caused by a conductive object (for example, finger) that contacts the piezoelectric element 440 through the touch sensing circuit 460, the processor 470 may determine (or identify) that a touch input has been detected from the piezoelectric element 440. Based on determining (or identifying) that a touch input has been detected from the piezoelectric element 440, the processor 470 may control at least one switching circuit 430 such that the piezoelectric element 440 and the sound output circuit 450 are electrically connected, and may then output sounds through the sound output circuit 450.

In various embodiments, although not illustrated, upon detecting a touch input from the piezoelectric element 440 through the touch sensing circuit 460, the processor 470 may transmit a signal related to the touch input to the external electronic device such that the external electronic device performs a function corresponding to the detected touch input. The disclosure is not limited thereto, and based on determining (or identifying) that touch input is detected from the piezoelectric element 440, the processor 470 may transmit a signal related to the touch input to the external electronic device such that an IoT device having a communication connection to the external electronic device performs a function corresponding to the detected touch input. In case that the touch input-related signal is transmitted to the external electronic device, the sound output through the sound output circuit 450 in operation 823 may include a sound for identifying (or informing) a function performed by the external electronic device or by the IoT device having a communication connection to the external electronic device.

In an embodiment, in operation 830, the processor 470 may identify whether the communication connection to an external electronic device is released. Upon identifying that the communication connection to an external electronic device is released (YES in operation 830), the processor 470 may perform operation 805 in which at least one switching circuit 430 is controlled such that the piezoelectric element 440 and the sound output circuit 450 are electrically connected.

In an embodiment, if it is not identified that the communication connection to an external electronic device has been released (NO in operation 830), the processor 470 may perform operation 820 in which it is identified whether a touch input is detected from the piezoelectric element 440 through the touch sensing circuit 460.

In an embodiment, if there is no communication connection to the external electronic device established through the short-range communication circuit 410 (NO in operation 810), the processor 470 may maintain the electric connection between the piezoelectric element 440 and the sound output circuit 450 in operation 850.

In an embodiment, if no touch input is detected from the piezoelectric element through the touch sensing circuit 460 (for example, NO in operation 820), the processor 470 may identify whether a sound output-related signal is received from the external electronic device in operation 835. For example, the sound output-related signal may be a signal for requesting a sound output for identifying the position of the electronic device 401 (and/or the position of the object on which the electronic device 401 is mounted).

In an embodiment, if a sound output-related signal is received from the external electronic device (for example, YES in operation 835), the processor 470 may control at least one switching circuit 430 such that the piezoelectric element 440 and the sound output circuit 450 are electrically connected in operation 840, and may then output sounds through the sound output circuit 450 in operation 845. The processor 470 may perform operation 815 in which at least one switching circuit 430 is controlled such that the piezoelectric element 440 and the touch sensing circuit 460 are electrically connected, after outputting sounds.

In an embodiment, if no sound output-related signal is received from the external electronic device (for example, NO in operation 835), the processor 470 may perform operation 830 in which it is identified whether the communication connection to the external electronic device has been released.

Although it has been described in various embodiments that the process is ended after maintaining the state in which the piezoelectric element 440 and the sound output circuit 460 are electrically connected in operation 850, the disclosure is not so limited. For example, in a state in which the piezoelectric element 440 and the sound output circuit 460 remain electrically connected, the processor 470 may perform operation 810 in which it is identified whether a connection to an external electronic device has been established through the short-range communication circuit 410.

In FIG. 6, FIG. 7 and FIG. 8 according to various embodiments, in case that the electronic device 401 has a communication connection to an external electronic device established through the short-range communication circuit 410, the electronic device 401 may be used as a device for controlling the external electronic device to perform a specific function or for controlling an IoT device having a communication connection to the external electronic device to perform a specific function, instead of being used to prevent and/or reduce or limit or avoid the loss of the object on which the electronic device 401 is mounted, using position information of the electronic device 401. In consideration thereof, the processor 470 may electrically connect the piezoelectric element 440 and the touch sensing circuit 460 if the electronic device 401 has a communication connection to an external electronic device such that the piezoelectric element 440 is used to detect touch inputs. In addition, if necessary (for example, upon receiving a sound output-related signal), the processor 470 may electrically connect the piezoelectric element 440 and the sound output circuit 450 temporarily such that the piezoelectric element 440 is used to output sounds.

As described above, the piezoelectric element 440 may be used to detect touch inputs or to output sounds according to whether a connection to an external electronic device is established or not, thereby improving the usability of the electronic device 401.

Figure 9:
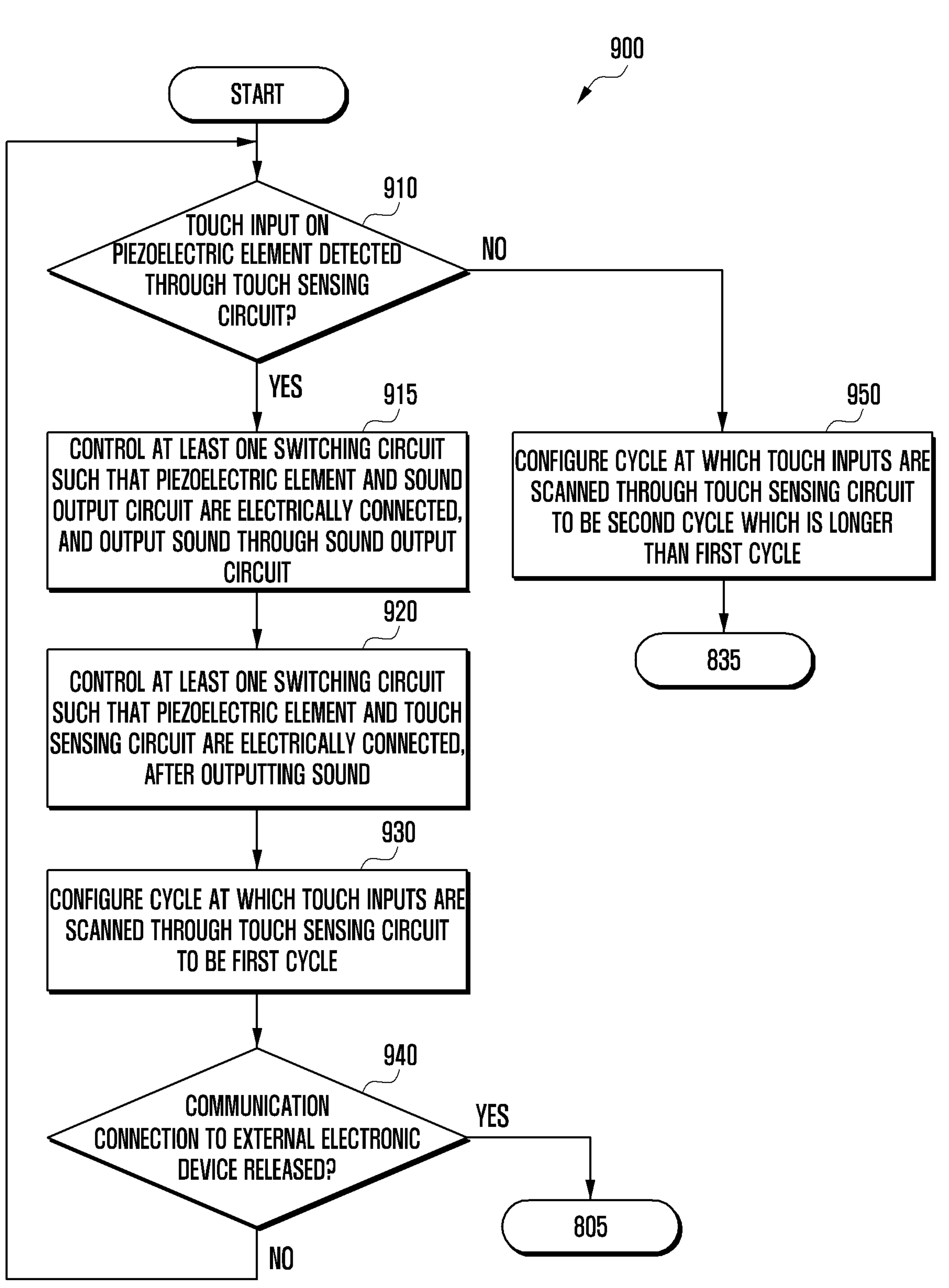
FIG. 9 is a flowchart illustrating an example method for adjusting the touch input sensing cycle, based on whether a touch input using a piezoelectric element is detected or not, according to various embodiments.

FIG. 9 is a flowchart 900 illustrating an example method for adjusting the touch input sensing cycle, based on whether a touch input using a piezoelectric element 440 is detected or not, according to various embodiments.

In the following example embodiment, respective operations may be performed successively, but are not necessarily performed successively. For example, the order of respective operations may be changed, and at least two operations may be performed in parallel.

In an embodiment, it may be understood that operations 910 to 950 are performed by the processor (for example, the processor 470 in FIG. 4) of the electronic device (for example, the electronic device 401 in FIG. 4).

FIG. 9 according to various embodiments may illustrate additional operations of the above-described operation 815 in FIG. 8.

Operations 910, 915, 920, and 940 in FIG. 9 according to various embodiments are identical to the above-described operations 820, 821, 823, and 830 in FIG. 8, and detailed descriptions thereof will not be repeated herein.

Referring to FIG. 9, in operation 910, the processor 470 may identify whether a touch input is detected from a piezoelectric element (for example, the piezoelectric element 440 in FIG. 4) through a touch sensing circuit (for example, the touch sensing circuit 460 in FIG. 4).

In an embodiment, the processor 470 may identify, through the touch sensing circuit 460, whether a change in capacitance is detected according to whether or not a conductive object (for example, a finger) contacts the piezoelectric element 440, thereby identifying whether touch inputs are detected from the piezoelectric element 440.

In an embodiment, if a touch input is detected from the piezoelectric element 440 through the touch sensing circuit 460 (for example, YES in operation 910), the processor 470 may control at least one switching circuit 430 such that the piezoelectric element 440 and a sound output circuit (for example, the sound output circuit 450 in FIG. 4) are electrically connected, and may output sounds through the sound output circuit 450, in operation 915. The processor 470 may control at least one switching circuit 430 such that the piezoelectric element 440 and the touch sensing circuit 460 are electrically connected, after outputting a sound, in operation 920. For example, upon identifying that a touch input is detected from the piezoelectric element 440, based on detecting a change in capacitance from the piezoelectric element 440 through the touch sensing circuit 460, the processor 470 may control at least one switching circuit 430 such that the piezoelectric element 440 and the sound output circuit 450 are electrically connected, and may output sounds through the sound output circuit 450. The disclosure is not so limited, and upon identifying that a touch input is detected from the piezoelectric element 440, based on detecting a change in capacitance from the piezoelectric element 440 through the touch sensing circuit 460, the processor 470 may transmit a touch input-related signal to the external electronic device such that the external electronic device (or an IoT device having a communication connection to the external electronic device) performs a function corresponding to the detected touch input. In an embodiment, sounds output through the sound output circuit 450 may include a sound output to identify (or inform) that a touch input has been detected and/or a sound for identifying (or informing) a function performed by the external electronic device or by an IoT device having a communication connection to the external electronic device.

In an embodiment, in operation 930, the processor 470 may configure the cycle at which touch inputs are scanned through the touch sensing circuit 460 to be a first cycle. In an embodiment, the first cycle may be about 100 ms. However, the disclosure is not limited thereto.

In an embodiment, the processor 470 may identify whether the communication connection to an external electronic device is released or not. If the communication connection to the external electronic device is not released (for example, NO in operation 940), the processor 470 may perform operation 910. If the communication connection to the external electronic device is released (for example, YES in operation 940), the processor 470 may perform operation 805 in which at least one switching circuit 430 is controlled such that the piezoelectric element 440 and the sound output circuit 450 are electrically connected in FIG. 8.

In an embodiment, if no touch input is detected from the piezoelectric element 440 through the touch sensing circuit 460 (for example, NO in operation 910), the processor 470 may configure the cycle at which touch inputs are scanned through the touch sensing circuit 460 to be a second cycle which is longer than the first cycle in operation 950. In an embodiment, the second cycle may be about 200 ms. However, the disclosure is not limited thereto.

In an embodiment, after configuring the cycle at which touch inputs are canned through the touch sensing circuit 460 to be a second cycle, the processor 470 may perform operation 835 in which it identified whether a sound output-related signal is received from the external electronic device in FIG. 8.

In various embodiments, although not illustrated, after configuring the cycle at which touch inputs are scanned through the touch sensing circuit 460 to be the second cycle, the processor 470 may identify whether a touch input is detected from the piezoelectric element 440. After configuring the cycle at which touch inputs are scanned to be a second cycle, and upon identifying that no touch input is detected from the piezoelectric element 440, the processor 470 may configure the cycle at which touch inputs are scanned through the touch sensing circuit 460 to be a third cycle which is longer than the second cycle. The third cycle may be about 400 ms. However, the disclosure is not limited thereto.

In various embodiments, although not illustrated, after configuring the cycle at which touch inputs are scanned through the touch sensing circuit 460 to be the third cycle, the processor 470 may identify whether a touch input is detected from the piezoelectric element 440. After configuring the cycle at which touch inputs are scanned to be the third cycle, and upon identifying that a touch input is detected from the piezoelectric element 440, the processor 470 may configure the cycle at which touch inputs are scanned through the touch sensing circuit 460 to be the second or first cycle which is shorter than the third cycle.

According to various embodiments, it will be assumed in the following description that the amount of current consumed in case that the cycle at which touch inputs are scanned through the touch sensing circuit 460 is configured to be a first cycle (for example, about 100 ms) is about 16 uA, the amount of current consumed in case that the cycle at which touch inputs are scanned through the touch sensing circuit 460 is configured to be a second cycle (for example, about 200 ms) is about 32 uA, and the amount of current consumed in case that the cycle at which touch inputs are scanned through the touch sensing circuit 460 is configured to be a third cycle (for example, about 400 ms) is about 64 uA.

In FIG. 9 according to various embodiments, if no touch input is detected from the piezoelectric element 400, the cycle at which touch inputs on the piezoelectric element 440 are scanned through the touch sensing circuit 460 may be adjusted from the first cycle (for example, about 100 ms) to the second cycle (for example, about 200 ms) or the third cycle (for example, about 400 ms), thereby reducing the amount of consumed current (for example, reduced from about 16 uA to about 32 uA or to about 64 uA).

A method for detecting a touch input using a piezoelectric element of an electronic device according to various example embodiments may include: based on a communication connection to an external electronic device being established through a short-range communication circuit in a state in which the piezoelectric element and a sound output circuit are electrically connected, controlling at least one switching circuit such that the piezoelectric element and a touch sensing circuit are electrically connected; based on a touch input being detected from the piezoelectric element through the touch sensing circuit, controlling the at least one switching circuit such that the piezoelectric element and the sound output circuit are electrically connected, and outputting a sound through the sound output circuit; and controlling the at least one switching circuit such that the piezoelectric element and the touch sensing circuit are electrically connected, after outputting the sound through the sound output circuit.

In an example embodiment, the outputting a sound through the sound output circuit may include determining that the touch input is detected from the piezoelectric element based on a change in capacitance being detected through the touch sensing circuit as a result of a contact between a conductive object and the piezoelectric element.

The method may further include: based on the touch input being detected from the piezoelectric element through the touch sensing circuit, transmitting a signal related to the touch input to the external electronic device through the short-range communication circuit such that the external electronic device or an Internet-of-things (IoT) device having a communication connection to the external electronic device performs a function corresponding to the detected touch input.

In an example embodiment, sounds output through the sound output circuit may include at least one of a sound output to identify that the touch input has been detected from the piezoelectric element and a sound for identifying a function performed by the external electronic device or the IoT device having a communication connection to the external electronic device.

The method may further include: based on a sound output-related signal being received from the external electronic device through the short-range communication circuit, controlling the at least one switching circuit such that the piezoelectric element and the sound output circuit are electrically connected, and outputting a sound related to the received signal through the sound output circuit.

In an example embodiment, the sound output-related signal may include a signal requesting a sound output for identifying the position of the electronic device.

The method may further include: based on the touch input not being detected from the piezoelectric element through the touch sensing circuit, configuring the cycle at which the touch input is scanned through the touch sensing circuit to be a first cycle.

The method may further include: based on the touch input not being detected from the piezoelectric element through the touch sensing circuit in a state in which the cycle at which the touch input is scanned through the touch sensing circuit is configured to be the first cycle, configuring the cycle at which the touch input is scanned through the touch sensing circuit to be a second cycle longer than the first cycle.

The method may further include: based on the touch input being detected from the piezoelectric element through the touch sensing circuit in a state in which the cycle at which the touch input is scanned through the touch sensing circuit is configured to be the second cycle, configuring the cycle at which the touch input is scanned through the touch sensing circuit to be the first cycle shorter than the second cycle.

The method may further include: maintaining the electric connection between the piezoelectric element and the sound output circuit based on no connection to an external electronic device being established through the short-range communication circuit.

The method may further include: identifying whether the communication connection to the external electronic device has been released; based on identifying that the communication connection to the external electronic device has been released, controlling the at least one switching circuit such that the piezoelectric element and the sound output circuit are electrically connected.

In an example embodiment, the electronic device may include a position tracking device mountable on an object.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., through wires), wirelessly, or via a third element.

As used in connection with various embodiments of the disclosure, the term "module" may include a unit implemented in hardware, software, or firmware, or any combination thereof, and may interchangeably be used with other terms, for example, “logic,” “logic block,” “part,” or “circuitry.” A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the “non-transitory” storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a housing;

a piezoelectric element disposed to one surface of the housing in an inner space of the housing;

a short-range communication circuit;

a sound output circuit;

a touch sensing circuit;

at least one switching circuit configured to control an electric connection between the piezoelectric element and the sound output circuit or an electric connection between the piezoelectric element and the touch sensing circuit; and at least one processor, comprising processing circuitry, operatively connected to the piezoelectric element, the short-range communication circuit, the sound output circuit, the touch sensing circuit, and the at least one switching circuit, wherein at least one processor, individually and/or collectively, is configured to:

based on a communication connection to an external electronic device being established through the short-range communication circuit in a state in which the piezoelectric element and the sound output circuit are electrically connected, control the at least one switching circuit such that the piezoelectric element and the touch sensing circuit are electrically connected;

based on a touch input being detected from the piezoelectric element through the touch sensing circuit, control the at least one switching circuit such that the piezoelectric element and the sound output circuit are electrically connected, and output a sound through the sound output circuit; and control the at least one switching circuit such that, after outputting the sound, the piezoelectric element and the touch sensing circuit are electrically connected.

2. The electronic device of claim 1, wherein at least one processor, individually and/or collectively, is configured to: determine that the touch input is detected from the piezoelectric element based on a change in capacitance being detected through the touch sensing circuit as a result of a contact between a conductive object and the piezoelectric element in a state in which the piezoelectric element and the touch sensing circuit are electrically connected.

3. The electronic device of claim 1, wherein at least one processor, individually and/or collectively, is configured to: based on the touch input being detected from the piezoelectric element through the touch sensing circuit, transmit a signal related to the touch input to the external electronic device through the short-range communication circuit such that the external electronic device or an Internet-of-things (IoT) device having a communication connection to the external electronic device performs a function corresponding to the detected touch input, and wherein the sound output through the sound output circuit comprises at least one of a sound output identifying that the touch input has been detected from the piezoelectric element, and a sound identifying a function performed by the external electronic device or the IoT device having a communication connection to the external electronic device.

4. The electronic device of claim 1, wherein at least one processor, individually and/or collectively, is configured to: based on a sound output-related signal being received from the external electronic device through the short-range communication circuit, control the at least one switching circuit such that the piezoelectric element and the sound output circuit are electrically connected, and output a sound related to the received signal through the sound output circuit, and wherein the sound output-related signal comprises a signal requesting a sound output for identifying a position of the electronic device.

5. The electronic device of claim 1, wherein at least one processor, individually and/or collectively, is configured to:

based on the touch input not being detected from the piezoelectric element through the touch sensing circuit, configure a cycle at which the touch input is scanned through the touch sensing circuit to be a first cycle.

6. The electronic device of claim 5, wherein at least one processor, individually and/or collectively, is configured to:

based on the touch input not being detected from the piezoelectric element through the touch sensing circuit in a state in which the cycle at which the touch input is scanned through the touch sensing circuit is configured to be the first cycle, configure the cycle at which the touch input is scanned through the touch sensing circuit to be a second cycle longer than the first cycle.

7. The electronic device of claim 6, wherein at least one processor, individually and/or collectively, is configured to:

based on the touch input being detected from the piezoelectric element through the touch sensing circuit in a state in which the cycle at which the touch input is scanned through the touch sensing circuit is configured to be the second cycle, configure the cycle at which the touch input is scanned through the touch sensing circuit to be the first cycle shorter than the second cycle.

8. The electronic device of claim 1, wherein at least one processor, individually and/or collectively, is configured to maintain the electric connection between the piezoelectric element and the sound output circuit based on no connection to an external electronic device being established through the short-range communication circuit.

9. The electronic device of claim 1, wherein at least one processor, individually and/or collectively, is configured to:

identify whether the communication connection to the external electronic device has been released; and based on identifying that the communication connection to the external electronic device has been released, control the at least one switching circuit such that the piezoelectric element and the sound output circuit are electrically connected.

10. The electronic device of claim 1, wherein the electronic device comprises a position tracking device mountable on an object.

11. A method for detecting a touch input using a piezoelectric element of an electronic device, the method comprising:

based on a communication connection to an external electronic device being established through a short-range communication circuit in a state in which the piezoelectric element and a sound output circuit are electrically connected, controlling at least one switching circuit such that the piezoelectric element and a touch sensing circuit are electrically connected;

based on a touch input being detected from the piezoelectric element through the touch sensing circuit, controlling the at least one switching circuit such that the piezoelectric element and the sound output circuit are electrically connected, and outputting a sound through the sound output circuit; and controlling the at least one switching circuit such that, after outputting the sound, the piezoelectric element and the touch sensing circuit are electrically connected.

12. The method of claim 11, wherein the outputting of a sound through the sound output circuit comprises:

determining that the touch input is detected from the piezoelectric element based on a change in capacitance being detected through the touch sensing circuit as a result of a contact between a conductive object and the piezoelectric element.

13. The method of claim 11, further comprising:

based on the touch input being detected from the piezoelectric element through the touch sensing circuit, transmitting a signal related to the touch input to the external electronic device through the short-range communication circuit such that the external electronic device or an Internet-of-things (IoT) device having a communication connection to the external electronic device performs a function corresponding to the detected touch input, and wherein the sound output through the sound output circuit comprises at least one of a sound output identifying that the touch input has been detected from the piezoelectric element, and a sound for identifying a function performed by the external electronic device or the IoT device having a communication connection to the external electronic device.

14. The method of claim 11, further comprising:

based on a sound output-related signal being received from the external electronic device through the short-range communication circuit, controlling the at least one switching circuit such that the piezoelectric element and the sound output circuit are electrically connected, and outputting a sound related to the received signal through the sound output circuit, wherein the sound output-related signal comprises a signal requesting a sound output for identifying a position of the electronic device.

15. The method of claim 11, further comprising:

based on the touch input not being detected from the piezoelectric element through the touch sensing circuit, configuring a cycle at which the touch input is scanned through the touch sensing circuit to be a first cycle.

16. The method of claim 15, further comprising:

based on the touch input not being detected from the piezoelectric element through the touch sensing circuit in a state in which the cycle at which the touch input is scanned through the touch sensing circuit is configured to be the first cycle, configuring the cycle at which the touch input is scanned through the touch sensing circuit to be a second cycle longer than the first cycle.

17. The method of claim 16, further comprising:

based on the touch input being detected from the piezoelectric element through the touch sensing circuit in a state in which the cycle at which the touch input is scanned through the touch sensing circuit is configured to be the second cycle, configuring the cycle at which the touch input is scanned through the touch sensing circuit to be the first cycle shorter than the second cycle.

18. The method of claim 11, further comprising:

maintaining the electric connection between the piezoelectric element and the sound output circuit based on no connection to an external electronic device being established through the short-range communication circuit.

19. The method of claim 11, further comprising:

identifying whether the communication connection to the external electronic device has been released; and based on identifying that the communication connection to the external electronic device has been released, controlling the at least one switching circuit such that the piezoelectric element and the sound output circuit are electrically connected.

20. The method of claim 11, wherein the electronic device comprises a position tracking device mountable on an object.

* * * * *